United States Patent
Umo et al.

(10) Patent No.: US 12,053,958 B2
(45) Date of Patent: Aug. 6, 2024

(54) MULTILAYER FILM HAVING A SOLUBLE TIE LAYER AND METHOD FOR DISSIPATING

(71) Applicant: Cryovac, LLC, Charlotte, NC (US)

(72) Inventors: David Ebung Umo, Charlotte, NC (US); Drew V. Speer, Charlotte, NC (US); Eric David Ellenbogen, Charlotte, NC (US); Robert Babrowicz, Tega Cay, SC (US)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 17/924,491

(22) PCT Filed: May 10, 2021

(86) PCT No.: PCT/US2021/031477
§ 371 (c)(1),
(2) Date: Nov. 10, 2022

(87) PCT Pub. No.: WO2021/231241
PCT Pub. Date: Nov. 18, 2021

(65) Prior Publication Data
US 2023/0173796 A1    Jun. 8, 2023

Related U.S. Application Data

(60) Provisional application No. 63/022,669, filed on May 11, 2020.

(51) Int. Cl.
*B32B 27/08* (2006.01)
*B32B 7/12* (2006.01)
(Continued)

(52) U.S. Cl.
CPC ............... *B32B 27/08* (2013.01); *B32B 7/12* (2013.01); *B32B 27/22* (2013.01); *B32B 27/304* (2013.01);
(Continued)

(58) Field of Classification Search
CPC .......... B32B 27/08; B32B 7/12; B32B 27/22; B32B 27/304; B32B 27/306;
(Continued)

(56) References Cited

U.S. PATENT DOCUMENTS 4,979,631 A   12/1990   Krishnaukumar et al.
5,077,111 A   12/1991   Collette
(Continued)

FOREIGN PATENT DOCUMENTS

CN   104231150   12/2014
CN   206287591   6/2017
(Continued)

*Primary Examiner* — John D Freeman
(74) *Attorney, Agent, or Firm* — Jason R. Womer

(57) ABSTRACT

A multilayer film having a soluble tie layer and method for dissipating the soluble tie layer from the multilayer film is disclosed. The multilayer film having a first outer layer; a first soluble tie layer comprising at least 10 wt %, at least 40 wt %, or at least 50 wt % of a neutralized ethylene acrylic acid copolymer. The soluble tie layer dissipates from the multilayer film when placed in a caustic solution.

14 Claims, 9 Drawing Sheets

(51) Int. Cl.
*B32B 27/22* (2006.01)
*B32B 27/30* (2006.01)
*B32B 27/32* (2006.01)
*B32B 27/34* (2006.01)
*B32B 27/36* (2006.01)

(52) U.S. Cl.
CPC .......... *B32B 27/306* (2013.01); *B32B 27/308* (2013.01); *B32B 27/32* (2013.01); *B32B 27/34* (2013.01); *B32B 27/36* (2013.01); *B32B 2250/24* (2013.01); *B32B 2250/40* (2013.01); *B32B 2270/00* (2013.01); *B32B 2307/716* (2013.01); *B32B 2307/7244* (2013.01); *B32B 2307/748* (2013.01)

(58) Field of Classification Search
CPC ....... B32B 27/308; B32B 27/32; B32B 27/34; B32B 27/36; B32B 2250/24; B32B 2250/40; B32B 2270/00; B32B 2307/716; B32B 2307/7244; B32B 2307/748
See application file for complete search history.

(56) References Cited

U.S. PATENT DOCUMENTS

| | | |
|---|---|---|
| 5,108,807 A | 4/1992 | Tucker |
| 5,527,845 A | 6/1996 | Strelow et al. |
| 5,665,824 A | 9/1997 | Chang et al. |
| 5,744,538 A | 4/1998 | Miller et al. |
| 5,750,605 A | 5/1998 | Blumenthal et al. |
| 6,428,900 B1 | 8/2002 | Wang |
| 7,740,951 B2 | 6/2010 | Thomasson et al. |
| 8,715,797 B2 | 5/2014 | Fouquay et al. |
| 9,976,057 B2 | 5/2018 | Schottland et al. |
| 10,131,130 B2 | 11/2018 | Rackovan et al. |
| 2003/0144422 A1* | 7/2003 | Honeycutt ............ B32B 27/306 525/221 |
| 2004/0024102 A1 | 2/2004 | Hayes et al. |
| 2006/0194010 A1 | 8/2006 | Hiscock |
| 2010/0242998 A1 | 9/2010 | Quillen et al. |
| 2010/0255228 A1 | 10/2010 | Dougherty et al. |
| 2013/0048221 A1 | 2/2013 | Blackwell et al. |
| 2013/0145665 A1 | 6/2013 | Mitchell et al. |
| 2014/0120280 A1 | 5/2014 | Dougherty et al. |
| 2017/0136747 A1 | 5/2017 | Torradas et al. |
| 2017/0225439 A1 | 8/2017 | Toft et al. |
| 2017/0246836 A1 | 8/2017 | Giusti et al. |
| 2018/0345637 A1 | 12/2018 | Hackfort et al. |
| 2018/0355135 A1 | 12/2018 | Jin et al. |

FOREIGN PATENT DOCUMENTS

| | | |
|---|---|---|
| EP | 615838 | 9/1994 |
| JP | H08176316 | 7/1996 |
| JP | 2012214571 | 11/2012 |
| WO | 2007057338 | 5/2007 |
| WO | 2018075762 | 4/2018 |
| WO | 2018215606 | 11/2018 |

* cited by examiner

MULTILAYER FILM HAVING A SOLUBLE TIE LAYER AND METHOD FOR DISSIPATING

CROSS-REFERENCE TO RELATED APPLICATIONS

This application claims priority to U.S. patent Application Ser. No. 63/022,669, filed May 11, 2020 and entitled "Multilayer Film Having a Soluble Tie Layer and Method For Dissipating," the entirety of which is incorporated herein by reference.

BACKGROUND

The subject matter disclosed herein relates to multilayer films containing soluble tie layers and methods of dissolving such film layers.

Typically, multilayer film structures made of distinct materials prove difficult to recycle and reuse. The materials are not easily separated and therefore it is difficult to obtain relatively pure materials from multilayer films.

While hot melt adhesives are known that can dissolve in a caustic wash, hot melt adhesives are not suitable for extrusion as part of a multilayer film structure. Furthermore, hot melt adhesives are ill suited to serve as a tie layer in a multilayer film structure.

Therefore, a multilayer film that can be separated in aqueous caustic wash to facilitate recycling is desired. The layers of the multilayer film are extruded, and therefore materials utilized must be extrudable at processing temperatures, provide adequate bond strength and allow for separation in an aqueous caustic wash.

The discussion above is merely provided for general background information and is not intended to be used as an aid in determining the scope of the claimed subject matter.

BRIEF DESCRIPTION

A multilayer film having a soluble tie layer and method for dissipating the soluble tie layer from the multilayer film is disclosed. The multilayer film having a first outer layer; a first soluble tie layer comprising at least 10 wt %, at least 40 wt %, or at least 50 wt % of a neutralized ethylene acrylic acid copolymer. The soluble tie layer dissipates from the multilayer film when placed in a caustic solution.

An advantage that may be realized in the practice of some disclosed embodiments of the soluble tie layer is that it allows for separation of multilayer film structure to aid in reuse and recycling.

In one exemplary embodiment, a multilayer film is disclosed. The multilayer film comprises a first outer layer; a first soluble tie adhered to two adjacent layers, the first soluble tie layer comprising at least 10 wt %, at least 20 wt %, at least 30 wt %, at least 40 wt %, or at least 50 wt % of an ethylene acrylic acid copolymer, ethylene methacrylic acid copolymer, or blend thereof which is between 20-90% neutralized; and a second outer layer. The soluble tie layer being disposed between the first and second outer layers, the soluble tie layer being adhered to the two adjacent layers with a bond strength of at least 2.5 N/15 mm, 3.5 N/15 mm, 3.5 N/15 mm, 4.0 N/15 mm, 4.5 N/15 mm, or 5.0 N/15 mm measured in accordance with ASTM F904. At least 90 wt % the soluble tie layer dissipates from the multilayer film in a caustic solution comprising 1 wt % sodium hydroxide within 30, 25, 20, 15 minutes at a temperature of 45° C., 55° C., 65° C., 75° C., 85° C., 95° C. when the multilayer film is prepared and tested with the remaining parameters being in accordance with APR draft testing standard PET-P-00.

In another exemplary embodiment, the multilayer film comprises a first outer layer; a first soluble tie adhered to two adjacent layers, the first soluble tie layer comprising at least 10 wt %, at least 20 wt %, at least 30 wt %, at least 40 wt %, or at least 50 wt % of an ethylene acrylic acid copolymer which is between 20-90% neutralized; and a second outer layer. The soluble tie layer being disposed between the first and second outer layers, the soluble tie layer being adhered to the two adjacent layers with a bond strength of at least 2.5 N/15 mm, 3.5 N/15 mm, 3.5 N/15 mm, 4.0 N/15 mm, 4.5 N/15 mm, or 5.0 N/15 mm measured in accordance with ASTM F904. The first soluble tie layer having a linear dissolution rate of at least 0.004 in/min in a 1 wt % NaOH solution at 85° C. measured in accordance with APR draft testing standard PET-P-00.

In another exemplary embodiment, a method of for separating at least one layer of a multilayer film is disclosed. The method comprises the steps of providing a multilayer film; the multilayer film comprising a first and second outer layer and a soluble tie layer adhered to two adjacent layers, the first soluble tie layer comprising at least 10 wt %, at least 20 wt %, at least 30 wt %, at least 40 wt %, or at least 50 wt % of an ethylene acrylic acid copolymer which is between 20-90% neutralized; chopping or grinding the multilayer film; subjecting the multilayer film for at least 30, 25, 20, 15 or 10 minutes to a caustic solution; the caustic solution being at an elevated temperature at or between any of the following ranges 40-50° C., 50-60° C., 60-70° C., 70-80° C., 80-90° C., 90-100° C. to cause the soluble tie layer to dissipate from the multilayer film resulting in dissolved and solid components of the multilayer film in the caustic solution; and collecting the solid components from the caustic solution. At least 90 wt % the soluble tie layer dissipates from the multilayer film in the caustic solution.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Figure 1A:
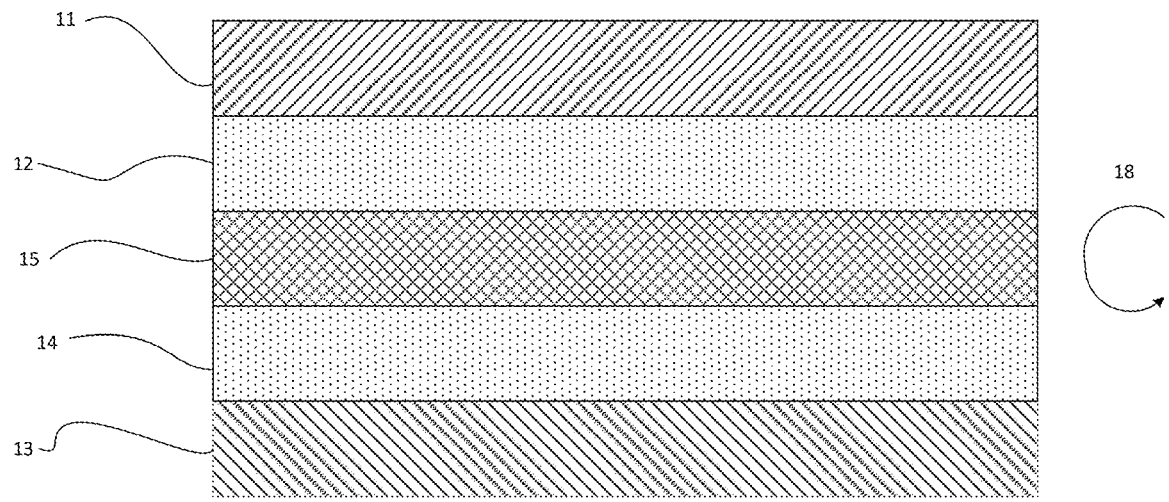
FIGS. 1A to 1D are an exemplary flow of a soluble tie layer in a caustic bath according to one aspect.

As used herein, the term "film" is inclusive of plastic web, regardless of whether it is film or sheet. The film can have a thickness of 0.25 mm or less, or a thickness of from 0.35 to 30 mils, or from 0.5 to 25 mils, or from 0.5 to 15 mils, or from 1 to 10 mils, or from 1 to 8 mils, or from 1.1 to 7 mils, or from 1.2 to 6 mils, or from 1.3 to 5 mils, or from 1.5 to 4 mils, or from 1.6 to 3.5 mils, or from 1.8 to 3.3 mils, or from 2 to 3 mils, or from 1.5 to 4 mils, or from 0.5 to 1.5 mils, or from 1 to 1.5 mils, or from 0.7 to 1.3 mils, or from 0.8 to 1.2 mils, or from 0.9 to 1.1 mils.

The multilayer films described herein include at least one soluble tie layer which bonds to two layers of the multilayer film with a bond strength of at least 2.5 N/15 mm, 3.5 N/15 mm, 3.5 N/15 mm, 4.0 N/15 mm, 4.5 N/15 mm, or 5.0 N/15 mm measured in accordance with ASTM F904. At least 90%, and in some embodiments at least 95% of the soluble tie layer dissipates from an adjacent layer by separating and/or dissolves in a caustic solution comprising 1 wt % sodium hydroxide within 30, 25, 20 or 15 minutes at an elevated temperature. The elevated temperature being 45° C., 55° C., 65° C., 75° C., 85° C., 95° C. and the multilayer film being prepared in accordance with APR draft testing standard PET-P-00 published Apr. 11, 2019, the contents of which are incorporated herein by reference. The remaining test parameters are in accordance with APR draft testing standard PET-P-00 published Apr. 11, 2019. The multilayer films may further include additional layers, for example to add bulk, provide functionality, barrier, abuse resistance, printing capability or to act as additional tie layers.

The soluble tie layer allows for the separation of layers of the film once placed in a caustic wash solution. This aids in recyclability and reusability of the distinct layers of the film. For example, layers that are not soluble will remain as solids. Depending on the buoyancy, some solids may sink or float, allowing for further separation of materials. The soluble materials can be later precipitated from the caustic solution.

The multilayer films described herein may comprise at least, and/or at most, any of the following numbers of layers: 3, 4, 5, 6, 7, 8, 9, 10, 11, 12, 13, 14 and 15. As used herein, the term "layer" refers to a discrete film component which is substantially coextensive with the film and has a substantially uniform composition. Where two or more directly adjacent layers have essentially the same composition, then these two or more adjacent layers may be considered a single layer for the purposes of this application. In embodiments, the multilayer film utilizes microlayers to form a single layer. A microlayer section may include between 10 and 1,000 microlayers in each microlayer section. In embodiments, one or more layer of the multilayer film may be a printed layer. In embodiments the printed layer is an ink which is soluble in a caustic wash.

Below are some non-limiting examples of combinations in which the alphabetical symbols designate the film layers. Where the multilayer film representation below includes the same letter more than once, each occurrence of the letter may represent the same composition or a different composition within the class that performs a similar function. It is understood that each letter could denote multiple layers within the class that performs a similar function. It is further understood that additional layers, such as bulk layers, are not recited below, but are contemplated.

A/C/A, A/C/B/A, A/C/D/A, A/C/B/C/A, A/C/B/D/A, A/B/C/D/A, A/B/D/C/A, A/B/C/B/A, A/C/D/C/A, A/D/C/D/A, A/B/C/B/D/A, A/B/C/B/C/A, A/B/C/D/B/A, A/B/C/D/C/A, A/B/D/B/C/A, A/B/D/C/B/A, A/B/D/C/D/A, A/C/B/C/B/A, A/C/B/C/D/A, A/C/B/D/B/A, A/C/B/D/C/A, A/C/D/B/D/A, A/C/D/C/B/A, A/D/C/B/D/A, A/D/B/D/C/A, A/B/C/D/B/A, A/B/D/C/B/C/A, A/B/D/C/B/D/A, A/C/B/C/B/D/A, A/C/B/C/D/A, A/C/B/D/B/D/A, A/C/B/D/C/A, A/D/C/B/C/D/A, A/C/B/C/B/D/C/A, A/C/B/C/B/D/C/A, A/C/B/D/C/D/A, A/C/B/D/B/D/C/A, A/D/C/B/C/B/C/A, A/D/C/B/D/A.

"A" represents an outer layer, as discussed herein.

"B" represents an inner layer including a barrier layer, as discussed herein.

"C" represents a soluble tie layer, as discussed herein.

"D" represents an adhesive tie layer, as discussed herein.

All compositional percentages used herein are presented on a "by weight" basis, unless designated otherwise.

Turning now to the multilayer film structure, the film structure includes two outer layers and at least one soluble tie layer. In embodiments, the multilayer film structure further includes at least one adhesive tie layer and/or at least one inner layer. The multilayer film is a polymer structure formed by coextrusion, extrusion coating, coating, lamination, or extrusion lamination.

The "outer layer" refers to what is typically an outermost, usually surface layer or skin layer of a multilayer film, although additional layers, coatings, and/or films can be adhered to it. In an embodiment, both outer layers are polyester outer layers comprising polyester and/or copolyester as the main component. In embodiments, the polyester and polyester copolymers comprise, 99.0 wt %, 99.1 wt %, 99.2 wt % 99.3 wt % 99.4 wt %, 99.5 wt %, 99.6 wt %, 99.7 wt %, 99.8 wt %, 99.9 wt %, or substantially all of one or both of the outer layers. In embodiments, the polyester is polyethylene terephthalate or recycled polyethylene terephthalate.

In other embodiments, at least one of the outer layers is a polyethene, in embodiments, at least one of the outer layers is an ethylene/alpha-olefin copolymer. In embodiments, ethylene/alpha-olefin copolymer comprises, 99.0 wt %, 99.1 wt %, 99.2 wt % 99.3 wt % 99.4 wt %, 99.5 wt %, 99.6 wt %, 99.7 wt %, 99.8 wt %, 99.9 wt %, or substantially all of one or both of the outer layers.

In other embodiments, at least one of the outer layers is a polyamide. In embodiments, at polyamide is selected from polyamide 6, polyamide 6/66, polyamide 6/6, amorphous polyamide (such as 6I/6T). In embodiments, polyamide comprises, 99.0 wt %, 99.1 wt %, 99.2 wt % 99.3 wt % 99.4 wt %, 99.5 wt %, 99.6 wt %, 99.7 wt %, 99.8 wt %, 99.9 wt %, or substantially all of one or both of the outer layers In an embodiment, at least one of the outer layers is a heat seal layer. A heat seal refers to any seal of a first region of a film surface to a second region of a film surface, wherein the seal is formed by heating the regions to at least their respective seal initiation temperatures. Heat-sealing is the process of joining two or more thermoplastic films or sheets by heating areas in contact with each other to the temperature at which fusion occurs, usually aided by pressure. The heating can be performed by any one or more of a wide variety of manners, such as using a heated bar, hot wire, hot air, infrared radiation, ultraviolet radiation, electron beam, ultrasonic, induction, and melt-bead. A heat seal is usually a relatively narrow seal (e.g., 0.02 inch to 1 inch wide) across a film. One particular heat sealing means is a heat seal made using an impulse sealer, which uses a combination of heat and pressure to form the seal, with the heating means providing a brief pulse of heat while pressure is being applied to the film by a seal bar or seal wire, followed by rapid cooling of the bar or wire.

Heat seal layers include thermoplastic polymers, including, but not limited to thermoplastic polyolefin, polyamide, polyester, and polyvinyl chloride. In embodiments, polymers for the sealant layer include homogeneous ethylene/alpha-olefin copolymer, heterogeneous ethylene/alpha-olefin copolymer, ethylene homopolymer, and ethylene/vinyl acetate copolymer. In some embodiments, the heat seal layer can comprise a polyolefin, particularly an ethylene/alpha-olefin copolymer. For example, a polyolefin having a density of from 0.88 g/cc to 0.917 g/cc, or from 0.90 g/cc to 0.917 g/cc, or less than 0.92 g/cc. More particularly, the seal layer can comprise at least one member selected from the group consisting of high density polyethylene, linear low density polyethylene, medium density polyethylene, low density polyethylene, very low density polyethylene, homogeneous ethylene/alpha-olefin copolymer, polypropylene and polypropylene copolymers. "Polymer" herein refers to homopolymer, copolymer, terpolymer, etc. "Copolymer" herein includes copolymer, terpolymer, etc.

In an embodiment, the heat seal layer has a melting point less than any of the following values: 220° C., 210° C., 200° C., 190° C., 180° C., 170° C., 160° C., 150° C., 140° C. and 130° C.; and the melting point of the heat seal layer may be at least any of the following values: 65° C., 70° C., 75° C., 80° C., 90° C., 100° C., 110° C., 120° C., 130° C., 140° C., and 150° C. In an embodiment, the heat seal layer comprises from 80 to 99 wt % of a linear low density polyethylene copolymer having a melting point between 90-130° C. In an embodiment, the heat seal layer comprises from 80 to 99 wt % of a very low density polyethylene copolymer having a melting point between 65-125° C. All references to the melting point of a polymer, a resin, or a film layer in this application refer to the melting peak temperature of the dominant melting phase of the polymer, resin, or layer as determined by differential scanning calorimetry according to ASTM D-3418.

In embodiments where the heat seal layer comprises amorphous material, then the heat seal layer may not clearly display a melting point. The glass transition temperature for the heat seal layer may be less than, and may range between, any of the following values: 125° C., 120° C., 110° C., 100° C., 90° C., 80° C., 70° C., 60° C., and 50° C.; measured where the relative humidity may be any of the following values: 100%, 75%, 50%, 25%, and 0%. All references to the glass transition temperature (Tg) of a polymer was determined by the Perkin Elmer "half Cp extrapolated" (the "half Cp extrapolated" reports the point on the curve where the specific heat change is half of the change in the complete transition) following the ASTM D3418 "Standard Test Method of Transition Temperatures of Polymers by Thermal Analysis," which is hereby incorporated, in its entirety, by reference thereto.

In an embodiment, at least one of the outer layers is an abuse layer. The primary function of the abuse layer is to provide puncture, abuse and abrasion resistance.

The thickness of the outer layer may be selected to provide sufficient material to affect a strong heat seal bond, or to provide abuse resistance, yet not so thick so as to negatively affect the characteristics of the film to an unacceptable level. The outer layer may have a thickness of at least any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The outer layer may have a thickness less than any of the following values: 5 mils, 4 mils, 3 mils, 2 mils, 1 mil, 0.7 mils, 0.5 mils, and 0.3 mils. The thickness of the outer layer as a percentage of the total thickness of the film may be less that any of the following values: 50%, 40%, 30%, 25%, 20%, 15%, 10%, and 5%; and may range between any of the forgoing values (e.g., from 10% to 30%).

The multilayer film includes a soluble tie layer as an inner layer of the multilayer film. The soluble tie layer bonds to two other layers of the multilayer film. At least 90%, 91%, 92%, 93%, 94%, 95%, 96%, 97%, 98%, 99%, 99.2% or substantially all of the soluble tie layer dissipates from an adjacent layer by separating and/or dissolves in a caustic solution comprising 1 wt % sodium hydroxide within 30, 25, 20 or 15 minutes at an elevated temperature. The elevated temperature being 45° C., 55° C., 65° C., 75° C., 85° C., 95° C. and the multilayer film being prepared in accordance with APR draft testing standard PET-P-00 published Apr. 11, 2019. The remaining test parameters are in accordance with APR draft testing standard PET-P-00 published Apr. 11, 2019. It is understood that while these parameters are directed to PET contain samples, the testing can be performed on non-PET containing samples.

In an embodiment, the soluble tie layer is capable of being extrusion coated, coated, and/or coextruded with an outer layer. In an embodiment, the soluble tie layer binds to a polyethlene or PET outer layer on one side and at least one other layer on the other side with sufficient interlayer bond strength to prevent adhesive failure. In an embodiment, the other layer is a barrier layer as described herein.

The term "bond strength" as used herein means the amount of force required to separate or delaminate the film at adjacent film layers by adhesive failure, or to cause cohesive failure within an adjacent layer, plus the force to bend the layers during the test, as measured in accordance with ASTM F904, using an Instron tensile tester crosshead speed of 10 inches per minute and five, 1-inch wide, representative samples while supporting the unseparated portion of each test specimen at 90° to the direction of draw. An "adhesive failure" is a failure in which the interfacial forces (e.g., valence forces or interlocking action or both) holding two surfaces together are overcome.

The minimum bond strength of the film is the weakest bond strength indicated from the testing of the separation at each of the layers of the film. The minimum bond strength indicates the internal strength with which a film remains intact to function as a single unit. The bond strength is provided both by inter-layer adhesion (i.e., the inter-layer adhesive bond strength) and by the intra-layer cohesion of each film layer (i.e., the intra-layer cohesive strength).

As used herein, an "adhesive failure" is a failure in which the interfacial forces (e.g., valence forces or interlocking action or both) holding two surfaces together are overcome. A "cohesive failure" is one in which the molecular attractive forces holding together a layer composition are overcome.

The minimum bond strength of the soluble tie layer to an adjacent layer may be at least about any of the following: 2.5 N/15 mm, 3.5 N/15 mm, 3.5 N/15 mm, 4.0 N/15 mm, 4.5 N/15 mm, 5.0 N/15 mm, 6.0 N/15 mm, 7.0 N/15 mm, 8.0 N/15 mm, 9.0 N/15 mm, 10.0 N/15 mm, 11.0 N/15 mm, or 12.0 N/15 mm. The minimum bond strength between each of the adjacent layers of a plurality of layers of the film may be at least about any of the values in the preceding sentence, measured according to ASTM F904.

The soluble tie layer is made from materials that can be coextruded with other layers of the multilayer film. For example, the soluble tie layer can be processed at temperatures required during extrusion of other layers of the multilayer film. Temperatures which often exceed, 200° C., 225° C., 250° C., 275° C. or 300° C.

The soluble tie layer comprises at least 10 wt %, 20 wt %, 30 wt %, 40 wt %, 50 wt %, 60 wt %, 70 wt %, 80 wt %, 90 wt % or 100 wt % of an ethylene acrylic acid copolymer, ethylene methacrylic acid copolymer or blends thereof, which between 20-90%, 30-80% or 40-70% of the acid moieties are neutralized through the addition of KOH or NaOH. In embodiments, the ethylene acrylic acid copolymer, ethylene methacrylic acid copolymer or blends thereof, has at least 50%, 55%, 60%, 65% or 70% acid moieties neutralized. In an embodiment the acid moieties are neutralized through the addition of KOH. In an embodiment the acid moieties are neutralized through the addition of NaOH. In embodiments the ethylene acrylic acid copolymer, ethylene methacrylic acid copolymer or blends thereof in the soluble tie includes 0.1%-4.0% maleic anhydride grafting.

In embodiments, the soluble tie layer further comprises up to 30 wt %, 20 wt %, 10 wt % or 5 wt % modified LLDPE, ethylene methyl acrylate, or ethylene methacrylic acid. In embodiments, the soluble tie layer further comprises up to 30 wt %, 20 wt %, 10 wt % or 5 wt % of a sulfopolyester. Exemplary sulfopolyesters include, but are not limited, to AQ™ brand sulfopolyesters available from Eastman Chemical. In embodiments, the soluble tie layer further comprises up to 40 wt. %, 30 wt. %, 20 wt. %, 10 wt. % or 5 wt. % polyamide derived from dimer fatty acids and diamines. Exemplary polyamides include but are not limited to Uni-Rez™ available from Kraton and Versamid® available from Gabriel. In embodiments, the soluble tie layer further comprises up to 40 wt %, 30 wt %, 20 wt %, 10 wt % or 5 wt % of a caustic soluble rosin modifier. Suitable rosin modifiers include, but are not limited to, gum rosin, wood rosin, tall oil rosin, hydrogenated rosin and other rosin derivatives soluble or dispersible in caustic solutions as described herein. In embodiments, the soluble tie layer further comprises up to 10 wt %, 9 wt %, 8 wt %, 7 wt %, 6 wt %, 5 wt %, 4 wt %, 3 wt %, 2 wt % or 1 wt % of a plasticizer or surfactant. In embodiments the plasticizer or surfactant includes glycerol, triacetin, citrate esters, ethoxylated fatty alcohols, sorbitan esters, ethoxylated sorbitan esters, fatty acids, fatty acid mono and diglycerides and blends thereof. In embodiments, the plasticizers and surfactants utilized in the soluble tie layer are soluble or dispersible in a caustic bath. In embodiments, the soluble tie layer further comprises an effective amount of antioxidant, such as 0.5-1.5 wt %. The antioxidant may be included in a master batch and may further contain primary and secondary antioxidants. The soluble tie layer may contain some or all of the components described in this paragraph. The combination of the components are soluble or dispersible in a caustic solution such that at least 90%, 91%, 92%, 93%, 94%, 95%, 96%, 97%, 98%, 99%, 99.2% or substantially all of the soluble tie layer dissipates from an adjacent layer by separating, dissolving or dispersing in a caustic solution comprising 1 wt % sodium hydroxide within 30, 25, 20 or 15 minutes at an elevated temperature. The elevated temperature being 45° C., 55° C., 65° C., 75° C., 85° C., 95° C. and the multilayer film being prepared in accordance with APR draft testing standard PET-P-00 published Apr. 11, 2019. The remaining test parameters are in accordance with APR draft testing standard PET-P-00 published Apr. 11, 2019.

In one embodiment, the soluble tie layer includes up to 30% a modified LLDPE, ethylene methyl acrylate, or ethylene methacrylic acid; between 10% and 90%, 20% and 80% or 30% and 70% based on weight of an ethylene acrylic acid copolymer, which has been 20-90% neutralized through the addition of KOH or NaOH; up to 30% of a sulfopolyester; up to 20% of a caustic soluble rosin modifier and up to 10% of a plasticizer.

In another embodiment, the soluble tie layer includes from 15-60% of an ethylene acrylic acid copolymer which has been 20-90% neutralized through the addition of KOH or NaOH, from 20-40% hydrogenated wood rosin, from 2-10% ethoxylated sorbitan monostearate, and 25-50% of a polyamide derived from dimer fatty acids and diamines.

In another embodiment, the soluble tie layer includes between 40% and 90%, 50% and 80% or 60% and 70% based on weight of an ethylene acrylic acid copolymer, which has been 20-90% neutralized through the addition of KOH or NaOH; up to 30% of a sulfopolyester; up to 20% of a caustic soluble rosin modifier and up to 10% of a plasticizer.

In an embodiment the soluble tie layer has a melt index or composite melt index of at least 0.3, 0.5, 1.0, 1.5, 2.0, 2.5, 3.0, 4.0, 5.0, 6.0, 7.0, 8.0, 9.0 or 10 g/10 min @190° C. and 2.16 kg measured in accordance with ASTM D1238.

The soluble tie layer may have a thickness of at least any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The outer layer may have a thickness less than any of the following values: 5 mils, 4 mils, 3 mils, 2 mils, 1 mil, 0.7 mils, 0.5 mils, and 0.3 mils. The thickness of the soluble tie layer as a percentage of the total thickness of the film may be less that any of the following values: 50%, 40%, 30%, 25%, 20%, 15%, 10%, and 5%; and may range between any of the forgoing values (e.g., from 10% to 30%).

In embodiments, the multilayer film includes at least one adhesive tie layer. An adhesive tie layer refers to an internal film layer that adheres two layers to one another. Useful adhesive tie polymers include thermoplastic polymers that may be compatible both with the polymer of one directly adjacent layer and the polymer of the other directly adjacent layer. Such dual compatibility enhances the adhesion of the tied layers to each other. Adhesive tie layers can be made from polyolefins such as modified polyolefin, ethylene/vinyl acetate copolymer, modified ethylene/vinyl acetate copolymer, ethylene/methyl acrylate copolymer, modified ethylene/methyl acrylate copolymer, and homogeneous ethylene/alpha-olefin copolymer. Typical tie layer polyolefins include anhydride modified grafted linear low density polyethylene, anhydride grafted (i.e., anhydride modified) low density polyethylene, anhydride grafted polypropylene, anhydride grafted methyl acrylate copolymer, anhydride grafted butyl acrylate copolymer, homogeneous ethylene/alpha-olefin copolymer, and anhydride grafted ethylene/vinyl acetate copolymer. The adhesive tie layer may include a copolyester, PET copolyester or blends thereof. In embodiments, the adhesive tie layer includes at least 0.5, 1.0, 1.5, 2.0, 2.5 or 3.0% by weight of a polymer found in adjacent layers.

The adhesive tie layer may have a thickness of at least any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The outer layer may have a thickness less than any of the following values: 5 mils, 4 mils, 3 mils, 2 mils, 1 mil, 0.7 mils, 0.5 mils, and 0.3 mils. The thickness of the adhesive tie layer as a percentage of the total thickness of the film may be less that any of the following values: 20%, 17%, 15%, 12%, 10%, 8%, 5%, and 3%; and may range between any of the forgoing values (e.g., from 5% to 20%).

The inner layer refers to a layer of the film which is not an outer or surface layer. The inner layer is between the two outer layers and may be in direct contact with an outer layer or there may be additional layers in between the inner layer and the outer layer.

In embodiments with multiple inner layers, the composition, thickness, and other characteristics of a second inner layer may be substantially the same as any of those of a first inner layer, or may differ from any of those of the first inner layer.

The multilayer film may further include at least one barrier layer. As used herein, the term "barrier", and the phrase "barrier layer", as applied to films and/or film layers, are used with reference to the ability of a film or film layer to serve as a barrier to one or more gases. Oxygen transmission rate is one method to quantify the effect of a barrier layer. As used herein, the term "oxygen transmission rate" refers to the oxygen transmitted through a film in accordance with ASTM D3985 "Standard Test Method for Oxygen Gas Transmission Rate Through Plastic Film and Sheeting Using a Coulometric Sensor," which is hereby incorporated, in its entirety, by reference thereto.

Useful barrier polymers include vinylidene chloride polymers ("PVdC"), ethylene/vinyl alcohol copolymers ("EVOH"), polyvinyl alcohol copolymers ("PVOH"), thermoplastic starch, polyester and/or polyamides.

Vinylidene chloride polymer ("PVdC") is a vinylidene chloride-containing polymer or copolymer—that is, a polymer that includes at least 50 wt % monomer units derived from vinylidene chloride ($CH_2=CCl_2$). PVdC optionally includes monomer units derived from one or more of vinyl chloride, styrene, vinyl acetate, acrylonitrile, and $C_1$-$C_{12}$ alkyl esters of (meth)acrylic acid (e.g., methyl acrylate, butyl acrylate, methyl methacrylate). As used herein, "(meth)acrylic acid" refers to both acrylic acid and/or methacrylic acid; and "(meth)acrylate" refers to both acrylate and methacrylate. Examples of PVdC include one or more of the following: vinylidene chloride homopolymer, vinylidene chloride/vinyl chloride copolymer ("VDC/VC"), vinylidene chloride/methyl acrylate copolymer ("VDC/MA"), vinylidene chloride/ethyl acrylate copolymer, vinylidene chloride/ethyl methacrylate copolymer, vinylidene chloride/methyl methacrylate copolymer, vinylidene chloride/butyl acrylate copolymer, vinylidene chloride/styrene copolymer, vinylidene chloride/acrylonitrile copolymer, and vinylidene chloride/vinyl acetate copolymer.

Useful PVdC includes that having at least about 75, at most about 95, and at most about 98 wt % vinylidene chloride monomer. Useful PVdC (for example, as applied by latex emulsion coating) includes that having at least about any of 5%, 10%, and 15%—and/or at most about any of 25%, 22%, 20%, and 15 wt % comonomer with the vinylidene chloride monomer.

Useful PVdC includes that having a weight-average molecular weight (Mw) of at least about any of the following 10,000; 50,000; 80,000; 90,000; 100,000; 111,000; 120,000; 150,000; and 180,000; and at most about any of the following: 180,000, 170,000; 160,000; 150,000; 140,000; 100,000; and 50,000. Useful PVdC also includes that having a viscosity-average molecular weight ($M_z$) of at least about any of the following: 130,000; 150,000; 170,000; 200,000; 250,000; and 300,000; and at most about any of the following: 300,000; 270,000; 250,000; and 240,000.

A barrier layer that comprises PVdC may also include a thermal stabilizer (e.g., a hydrogen chloride scavenger such as epoxidized soybean oil) and a lubricating processing aid (e.g., one or more polyacrylates).

Ethylene/vinyl alcohol copolymer ("EVOH") is another useful barrier polymer. EVOH may have an ethylene content of about 32%, or at least about any of the following values: 20%, 25%, 30%, and 38% by weight. EVOH may have an ethylene content of at most about any of the following values: 50%, 48%, 40%, 35%, and 33% by weight. EVOH may include saponified or hydrolyzed ethylene/vinyl acetate copolymers, such as those having a degree of hydrolysis of at least about any of the following values: 50%, 85%, 95%, 95%. EVOH may have an ethylene content ranging from about 20 mole percent to about 44 mole percent. Exemplary EVOH is commercially available from Evalca Corporation having ethylene contents of 29, 32, 35, 38 and 44 mole percent.

Polyvinyl alcohol copolymers ("PVOH") is another useful barrier polymer. For example, PVOH being at least 95% hydrolyzed.

Thermoplastic starches that are high amylose starch and modified starch derived from wheat, maize, potato, rice, oat, arrowroot or pea sources are also useful barrier materials. Starches modified by reaction with a hydroxyl alkyl group, acetate or a dicarboxylic acid anhydride or a grafting polymer are also useful.

Certain polyamides are known to provide barrier properties. Such polyamides include, but are not limited to, polycaprolactam (nylon 6), metaxylylene adipamide (MXD6), hexamethylene adipamide (nylon 66), amorphous polyamides such as nylon 6I, 6T, as well as various amide copolymers and various blends of the above.

Certain polyesters further provide barrier properties. Polyesters are homopolymers or copolymers having an ester linkage between monomer units, which may be formed, for example, by condensation polymerization reactions between a dicarboxylic acid and a glycol. Suitable polyesters include poly(ethylene 2,6-naphtalate), poly(butylene terephthalate), poly(ethylene terephthalate), poly(ethylene furanoate) and copolyesters obtained by reacting one or more, aromatic, dicarboxylic acids with one or more dihydroxy alcohols, such as PETG which is an amorphous co-polyesters of terephthalic acid with ethylene glycol and 1,4-cyclohexanedimethanol.

The barrier layer may comprise one or more barrier polymers in an amount of at least about any of the following: 50%, 60%, 70%, 80%, 90%, 95%, and 100%; and/or at most about any of the following: 60%, 70%, 80%, 90%, and 95%, based on the weight of the barrier layer. In some embodiments the barrier polymers are selected from the group of one or more of any of EVOH, PVOH, polyester, thermoplastic starch, PVdC, and polyamides. In other embodiments, the barrier layer is a polyester coated with PVdC, silicon oxide or aluminum oxide.

In embodiments containing a barrier layer, an additional inner layer may be, for example, between the outer layer and the barrier layer. The additional inner layer may be directly adjacent the outer layer, so that there is no intervening layer between the additional inner and outer layers. The additional inner layer may be directly adjacent the barrier layer, so that there is no intervening layer between the additional inner and barrier layers. The additional inner layer may be directly adjacent both the outer layer and the barrier layer.

The inner layer may have a thickness of at least about, and/or at most about, any of the following: 0.05, 0.1, 0.15, 0.2, 0.25, 0.5, 1, 2, 3, 4, and 5 mils. If functioning as a barrier layer, the barrier layer may have a thickness and composition sufficient to impart to the film comprising the barrier layer an oxygen transmission rate listed herein. The thickness of the inner layer as a percentage of the total thickness of the film may be at least about, and/or at most about, any of the following: 1, 3, 5, 7, 10, 15, 20, 25, 30, 35, 40, 45, and 50 percent.

An inner layer may be a functional or bulk layer. Bulk layers are often a layer or layers of a film that can increase the abuse resistance, toughness, or modulus of a film or simply add thickness and may include recycled content. In some embodiments the film comprises a bulk layer that functions to increase the abuse resistance, toughness, and/or modulus of the film. Bulk layers generally comprise polymers that are inexpensive relative to other polymers in the film that provide some specific purpose unrelated to abuse-resistance, modulus, etc. In an embodiment, the bulk layer comprises at least one member selected from the group consisting of: ethylene/alpha-olefin copolymer, ethylene homopolymer, propylene/alpha-olefin copolymer, propylene homopolymer, propylene copolymer and combinations thereof.

As used herein, the term "polyolefin" refers to olefin polymers and copolymers, especially ethylene and propylene polymers and copolymers, and to polymeric materials having at least one olefinic comonomer. Polyolefins can be linear, branched, cyclic, aliphatic, aromatic, substituted, or unsubstituted. Included in the term polyolefin are homopolymers of olefin, copolymers of olefin, copolymers of an olefin and a non-olefinic comonomer copolymerizable with the olefin, such as vinyl monomers, acrylics, modified polymers of the foregoing, and the like. Modified polyolefins include modified polymers prepared by copolymerizing or grafting the homopolymer of the olefin or copolymer thereof with an unsaturated carboxylic acid, e.g., maleic acid, fumaric acid or the like, or a derivative thereof such as the anhydride, ester, metal salt of the carboxylic acid or the like. It could also be obtained by incorporating into the olefin homopolymer or copolymer, an unsaturated carboxylic acid, e.g., maleic acid, fumaric acid or the like, or a derivative thereof such as the anhydride, ester metal salt of the carboxylic acid or the like. In an embodiment, the heat seal layer is mainly composed of polyolefin. In an embodiment, the heat seal layer has a total polyolefin content of from 90 to 99 wt % based on the total composition of the heat seal layer.

Ethylene homopolymer or copolymer refers to ethylene homopolymer such as low density polyethylene, medium density polyethylene, high density polyethylene; ethylene/alpha olefin copolymer such as those defined hereinbelow; and other ethylene copolymers such as ethylene/vinyl acetate copolymer; ethylene/alkyl acrylate copolymer; or ethylene/(meth)acrylic acid copolymer. Ethylene/alpha-olefin copolymer herein refers to copolymers of ethylene with one or more comonomers selected from C4 to C10 alpha-olefins such as butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to ethylene/alpha-olefin copolymers and which high pressure polyethylenes contain both long chain and short chain branches. Ethylene/alpha-olefin copolymers include one or more of the following: 1) high density polyethylene, for example having a density greater than 0.94 g/cm$^3$, 2) medium density polyethylene, for example having a density of from 0.93 to 0.94 g/cm$^3$, 3) linear medium density polyethylene, for example having a density of from 0.926 to 0.94 g g/cm$^3$, 4) low density polyethylene, for example having a density of from 0.915 to 0.939 g/cm$^3$, 5) linear low density polyethylene, for example having a density of from 0.915 to 0.935 g/cm$^3$, 6) very-low or ultra-low density polyethylene, for example having density below 0.915 g/cm$^3$, and homogeneous ethylene/alpha-olefin copolymers. Homogeneous ethylene/alpha-olefin copolymers include those having a density of less than about any of the following: 0.925, 0.922, 0.92, 0.917, 0.915, 0.912, 0.91, 0.907, 0.905, 0.903, 0.90, and 0.86 g/cm$^3$. Unless otherwise indicated, all densities herein are measured according to ASTM D1505.

"Polyamide" herein refers to polymers having amide linkages along the molecular chain, and preferably to synthetic polyamides such as nylons. Furthermore, such term encompasses both polymers comprising repeating units derived from monomers, such as caprolactam, which polymerize to form a polyamide, as well as polymers of diamines and diacids, and copolymers of two or more amide monomers, including nylon terpolymers, sometimes referred to in the art as "copolyamides". "Polyamide" specifically includes those aliphatic polyamides or copolyamides commonly referred to as e.g. polyamide 6 (homopolymer based on ε-caprolactam), polyamide 69 (homopolycondensate based on hexamethylene diamine and azelaic acid), polyamide 610 (homopolycondensate based on hexamethylene diamine and sebacic acid), polyamide 612 (homopolycondensate based on hexamethylene diamine and dodecandioic acid), polyamide 11 (homopolymer based on 11-aminoundecanoic acid), polyamide 12 (homopolymer based on ω-aminododecanoic acid or on laurolactam), polyamide 6/12 (polyamide copolymer based on ε-caprolactam and laurolactam), polyamide 6/66 (polyamide copolymer based on ε-caprolactam and hexamethylenediamine and adipic acid), polyamide 66/610 (polyamide copolymers based on hexamethylenediamine, adipic acid and sebacic acid), modifications thereof and blends thereof. Polyamide also includes crystalline or partially crystalline, amorphous (6I/6 T), aromatic or partially aromatic, polyamides.

As used herein, "Polyesters" includes polymers made by: 1) condensation of polyfunctional carboxylic acids with polyfunctional alcohols, 2) polycondensation of hydroxycarboxylic acid, and 3) ring opening polymerization of cyclic esters (e.g., lactone).

Exemplary polyfunctional carboxylic acids (which includes their derivatives such as anhydrides or simple esters like methyl esters) include aromatic dicarboxylic acids and derivatives (e.g., terephthalic acid, isophthalic acid, dimethyl terephthalate, dimethyl isophthalate, 2,5-furandicarboxylic acid, naphthalene-2,6-dicarboxylic acid) and aliphatic dicarboxylic acids and derivatives (e.g., adipic acid, azelaic acid, sebacic acid, oxalic acid, succinic acid, glutaric acid, dodecanoic diacid, 1,4-cyclohexane dicarboxylic acid, dimethyl-1,4-cyclohexane dicarboxylate ester, dimethyl adipate). Representative dicarboxylic acids may be represented by the general formula:

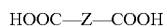

HOOC—Z—COOH where Z is representative of a divalent aliphatic radical containing at least 2 carbon atoms. Representative examples include adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid ("I") and terephthalic acid ("T"). As is known to those of skill in the art, polyesters may be produced using anhydrides and esters of polyfunctional carboxylic acids.

Exemplary polyfunctional alcohols include dihydric alcohols (and bisphenols) such as ethylene glycol, diethylene glycol, 1,2-propanediol, 1,3-propanediol, 1,3 butanediol, 1,4-butanediol, 1,4-cyclohexanedimethanol, 2,2-dimethyl-1,3-propanediol, 1,6-hexanediol, poly(tetrahydroxy-1,1'-biphenyl, 1,4-hydroquinone, bisphenol A, and cyclohexane dimethanol ("CHDM").

Exemplary hydroxycarboxylic acids and lactones include 4-hydroxybenzoic acid, 6-hydroxy-2-naphthoic acid, pivalolactone, and caprolactone.

Exemplary polyesters include polyethylene terephtalate or recycled polyethylene terephtalate. Exemplary polyesters may be derived from lactone polymerization; these include, for example, polycaprolactone and polylactic acid.

The polyester may comprise or be modified polyester. Exemplary modified polyester includes glycol-modified polyester and acid-modified polyester. Modified polyesters are made by polymerization with more than one type of comonomer in order to disrupt the crystallinity and thus render the resulting polyester more amorphous.

A glycol-modified polyester is a polyester derived by the condensation of at least one polyfunctional carboxylic acid with at least two types of polyfunctional alcohols. For example, glycol-modified poly(ethylene terephthalate) or "PETG" may be made by condensing terephthalic acid with ethylene glycol and cyclohexane dimethanol ("CHDM"). A useful PETG is available from Eastman Corporation under the Eastar 6763 trade name, and is believed to have about 34 mole % CHDM monomer content, about 16 mole % ethylene glycol monomer content, and about 50 mole % terephthalic acid monomer content. Another useful glycol-modified polyester may be made similar to PETG, but substituting dimethyl terephthalate for the terephthalic acid component. Another exemplary glycol-modified polyester is available under the Ecdel 9965 trade name from Eastman Corporation, and is believed to have a density of 1.13 g/cc and a melting point of 195° C. and to be derived from dimethyl 1,4 cyclohexane-dicarboxylate, 1,4 cyclohexane-dimethanol, and poly (tetramethylene ether glycol).

Exemplary acid-modified polyester may be made by condensation of at least one polyfunctional alcohol with at least two types of polyfunctional carboxylic acids. For example, at least one of the polyfunctional alcohols listed above may be condensed with two or more of the polyfunctional carboxylic acids listed above (e.g., isophthalate acid, adipic acid, and/or Naphthalene-2,6-dicarboxylic acid). An exemplary acid-modified polyester may be derived from about 5 mole % isophthalic acid, about 45 mole % terephthalic acid, and about 50 mole % ethylene glycol, such as that available from Invista Corporation.

The polyester may be selected from random polymerized polyester or block polymerized polyester.

The polyester may be derived from one or more of any of the constituents discussed above. If the polyester includes a mer unit derived from terephthalic acid, then such mer content (mole %) of the diacid of the polyester may be at least about any the following: 70, 75, 80, 85, 90, and 95%.

The polyester may be thermoplastic. The polyester may be substantially amorphous, or may be partially crystalline (semi-crystalline). The polyester and/or the skin layer may have a crystallinity of at least about, and/or at most about, any of the following weight percentages: 5, 10, 15, 20, 25, 30, 35, 40, and 50%.

The crystallinity may be determined indirectly by the thermal analysis method, which uses heat-of-fusion measurements made by differential scanning calorimetry ("DSC"). All references to crystallinity percentages of a polymer, a polymer mixture, a resin, a film, or a layer in this Application are by the DSC thermal analysis method, unless otherwise noted. The DSC thermal analysis method is believed to be the most widely used method for estimating polymer crystallinity, and thus appropriate procedures are known to those of skill in the art. See, for example, "Crystallinity Determination," Encyclopedia of Polymer Science and Engineering, Volume 4, pages 482-520 (John Wiley & Sons, 1986), of which pages 482-520 are incorporated herein by reference.

Under the DSC thermal analysis method, the weight fraction degree of crystallinity (i.e., the "crystallinity" or "Wc") is defined as $\Delta H_f / \Delta H_{f,c}$ where "$\Delta H_f$" is the measured heat of fusion for the sample (i.e., the area under the heat-flow versus temperature curve for the sample) and "$\Delta H_{f,c}$" is the theoretical heat of fusion of a 100% crystalline sample. The $\Delta H_{f,c}$ values for numerous polymers have been obtained by extrapolation methods; see for example, Table 1, page 487 of the "Crystallinity Determination" reference cited above. The $\Delta H_{f,c}$ for polymers are known to, or obtainable by, those of skill in the art. The $\Delta H_{f,c}$ for a sample polymer material may be based on a known $\Delta H_{f,c}$ for the same or similar class of polymer material, as is known to those of skill in the art. For example, the $\Delta H_{f,c}$ for polyethylene may be used in calculating the crystallinity of an EVA material, since it is believed that it is the polyethylene backbone of EVA rather than the vinyl acetate pendant portions of EVA that forms crystals. Also by way of example, for a sample containing a blend of polymer materials, the $\Delta H_{f,c}$ for the blend may be estimated using a weighted average of the appropriate $\Delta H_{f,c}$ for each of the polymer materials of separate classes in the blend.

The DSC measurements may be made using a thermal gradient for the DSC of 10° C./minute. The sample size for the DSC may be from 5 to 20 mg.

The multilayer film may be manufactured by thermoplastic film-forming processes known in the art. The film may be prepared by extrusion or coextrusion utilizing, for example, a tubular trapped bubble film process or a flat film (i.e., cast film or slit die) process. The film may also be prepared by applying one or more layers by extrusion coating, adhesive lamination, extrusion lamination, solvent-borne coating, or by latex coating (e.g., spread out and dried on a substrate). A combination of these processes may also be employed.

The film may be oriented in either the machine (i.e., longitudinal), the transverse direction, or in both directions (i.e., biaxially oriented), for example, to enhance the strength, optics, and durability of the film. A web or tube of the film may be uniaxially or biaxially oriented by imposing a draw force at a temperature where the film is softened (e.g., above the vicat softening point; see ASTM 1525) but at a temperature below the film's melting point. The film may then be quickly cooled to retain the physical properties generated during orientation and to provide a heat-shrink characteristic to the film. The film may be oriented using, for example, a tenter-frame process or a bubble process (double bubble, triple bubble and likewise). These processes are known to those of skill in the art, and therefore are not discussed in detail here. The orientation may occur in at least one direction by at least about, and/or at most about, any of the following ratios: 1.5:1, 2:1, 2.5:1, 3:1, 3.5:1, 4:1, 5:1, 6:1, 7:1, 8:1, 9:1, 10:1, 12:1, and 15:1.

In embodiments the multilayer film structure has an oxygen transmission rate of no more than: 5, 10, 15, 20, 25, 30, 35, 40, 45, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900 or 4000 cubic centimeters (at standard temperature and pressure) per square meter per day per 1 atmosphere of oxygen pressure differential measured at 0% relative humidity and 23° C. measured according to ASTM D-3985 which is hereby incorporated by reference in its entirety. In embodiments the multilayer film structure has an oxygen transmission rate of less than 4000, 3000, 2000 or 1000 cubic centimeters (at standard temperature and pressure) per square meter per day per 1 atmosphere of oxygen pressure differential measured at 0% relative humidity and 23° C. measured according to ASTM D-3985. Unless otherwise stated, OTR values provided herein are measured at 0% relative humidity and at a temperature of 23° C.

The minimum bond strength of the film may be at least about any of the following: 2.5 N/15 mm, 3.5 N/15 mm, 3.5 N/15 mm, 4.0 N/15 mm, 4.5 N/15 mm, or 5.0 N/15 mm. The minimum bond strength between each of the adjacent layers of a plurality of layers of the film may be at least about any of the values in the preceding sentence, measured according to ASTM F904.

The minimum bond strength between the intermediate layer and each of the layers directly adjacent the intermediate layer may be at least about any of the following: 2.5 N/15 mm, 3.5 N/15 mm, 3.5 N/15 mm, 4.0 N/15 mm, 4.5 N/15 mm, or 5.0 N/15 mm measured according to ASTM F904.

Film transparency (also referred to herein as film clarity) was measured in accordance with ASTM D 1746-97 "Standard Test Method for Transparency of Plastic Sheeting", published April 1998, which is hereby incorporated, in its entirety, by reference thereto. The results are reported herein as "percent transparency". The multilayer film can exhibit a transparency of at least 15 percent, or at least 20 percent, or at least 25 percent, or at least 30 percent, measured using ASTM D 1746-97.

Film haze values were measured in accordance with ASTM D 1003-00 "Standard Test Method for Haze and Luminous Transmittance of Transparent Plastics", published July 2000, which is hereby incorporated, in its entirety, by reference thereto. The results are reported herein as "percent haze". The multilayer film can exhibit a haze of less than 7.5 percent, or less than 7 percent, or less than 6 percent, measured using ASTM D 1003-00.

Film gloss values were measured in accordance with ASTM D 2457-97 "Standard Test Method for Specular Gloss of Plastic Films and Solid Plastics", published Jan. 10, 1997, which is hereby incorporated, in its entirety, by reference thereto. The results are reported herein as "percent gloss". The film can exhibit a gloss, as measured using ASTM D 2457-97, of from 60% to 100%, or from 70% to 90%.

Turning now to FIGS. 1A-1D there is shown a process for dissipating a soluble tie layer from a multilayer film structure. The multilayer film is chopped, ground or prepared in accordance with APR draft testing standard PET-P-00 and placed in a caustic solution at an elevated temperature. The chopped film pieces are subjected to a caustic solution (consisting of 1 wt % NaOH at a temperature of 85° C., utilizing a 15 min wash time as outlined in APR draft Testing standard PET-P-00)

Figure 1B:
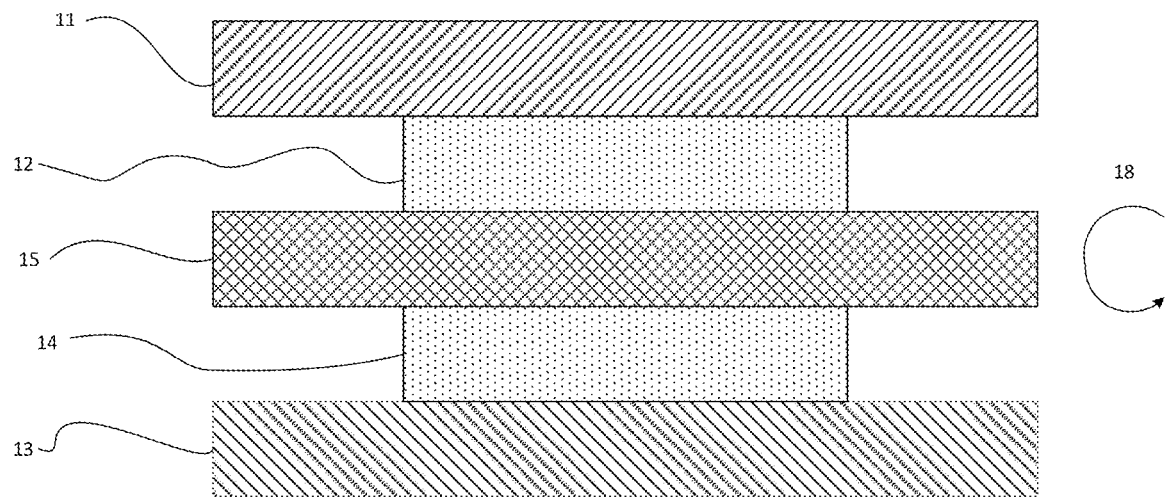
Figure 1C:
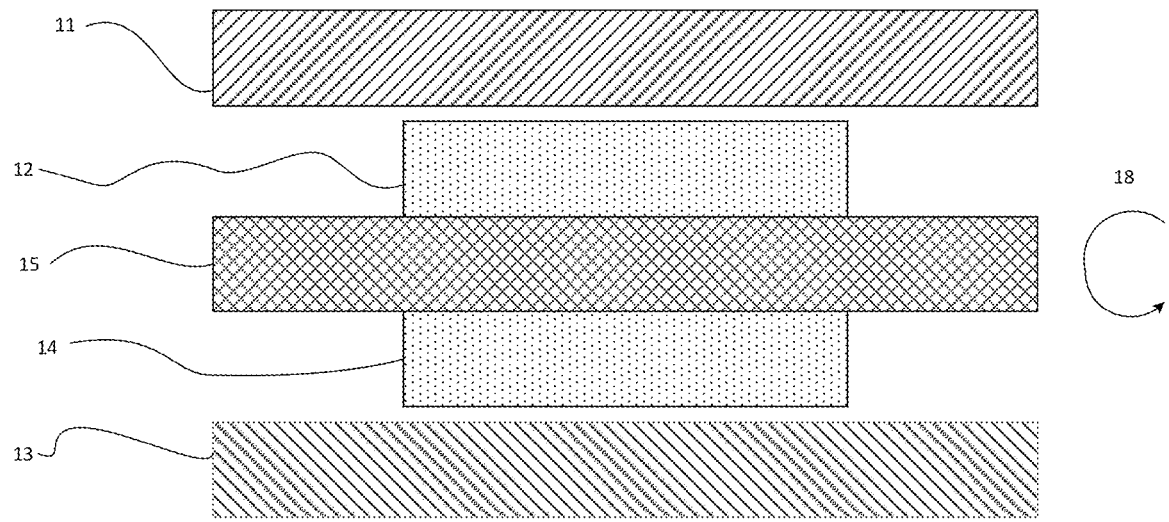
Figure 1D:
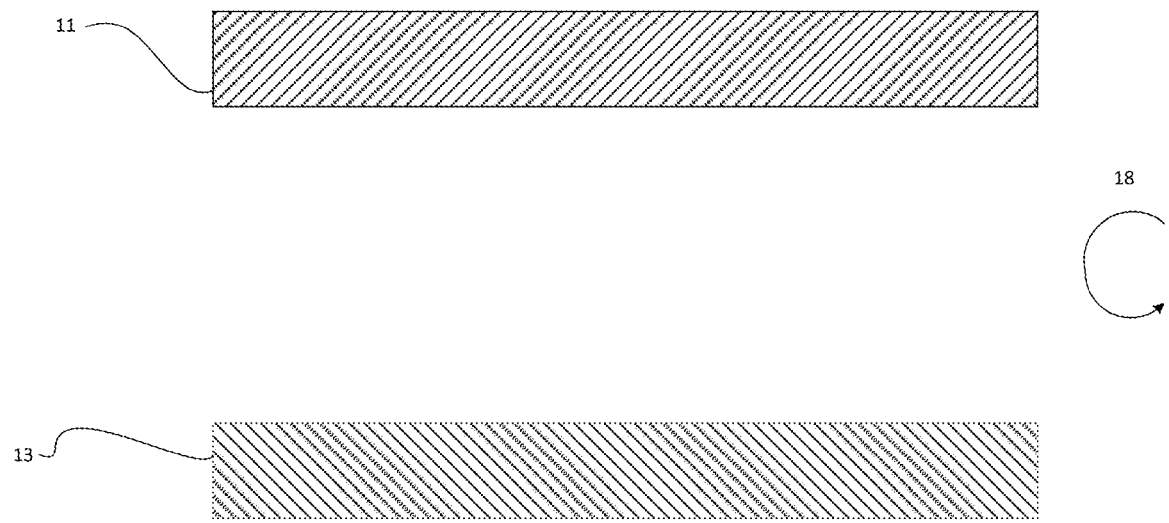

As time progresses the soluble tie layers 12 and 14 begin to dissolve from and dissipate from adjacent layers, outer layer 11, inner layer 15 and outer layer 13 as shown in FIG. 1B. As time further progresses as shown in FIG. 1C the soluble tie layers 12 and 14 separate from adjacent outer layers 11 and 13 allowing additional caustic solution 18 to contact the soluble tie layers 12 and 14. While it is shown that the soluble tie layers separate from the outer layers, it is understood that the soluble tie layer could separate from the inner layer or any adjacent layer. Furthermore, the soluble tie layer may dissolve in solution prior to separation from any one or both layers. As shown in FIG. 1D the soluble tie layers have dissipated from both adjacent layers. In the embodiment shown in FIG. 1D the inner layer 15 is also soluble in the caustic solution and the only solid remaining in the solution are the outer layers 11 and 13. While a 5 layer film structure is shown, the number of layers is not intended on being limiting and FIGS. 1A-1D are intended to demonstrate the dissipation of the soluble tie layer(s). It is understood that any number of layers and number of soluble tie layers may be present. In addition, inner layers may also be soluble, or in some embodiments, remain suspended in the solution.

The remaining solid components can be filtered, washed, rinsed, and collected. In embodiments, the non-soluble components have a purity of at least 95%, 96%, 97%, 98%, 99% or 99.2%. The collected components can be sent for recycling or reuse. In some embodiment, dissolved components could be precipitated out of solution and later collected. If there are multiple solid components, the solid components can be separated by methods such as sink/float collection and other known processes.

Turning now to FIGS. 2-12 are shown various exemplary embodiments of multilayer film structures. While a number of embodiments are shown, it is understood that the FIGS. are not exhaustive of potential film structures containing soluble tie layers.

Figure 2:
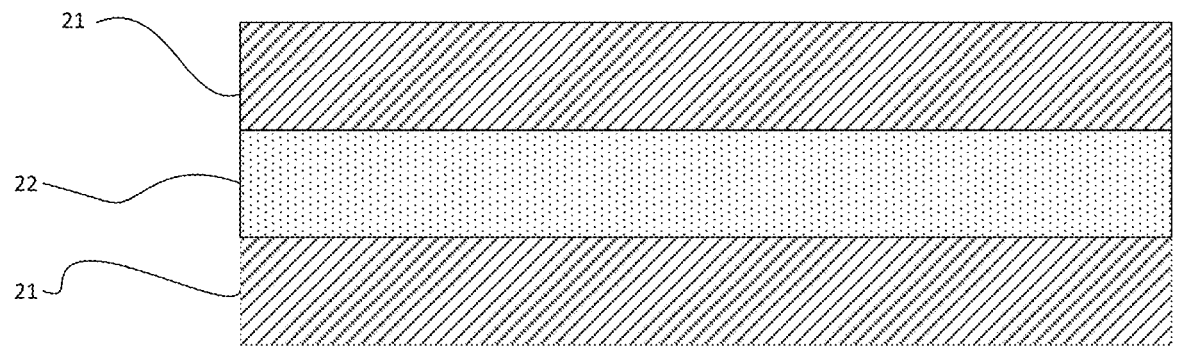
FIG. 2 is a cross section view of a multilayer film containing a soluble tie layer according to one aspect.
Figure 3:
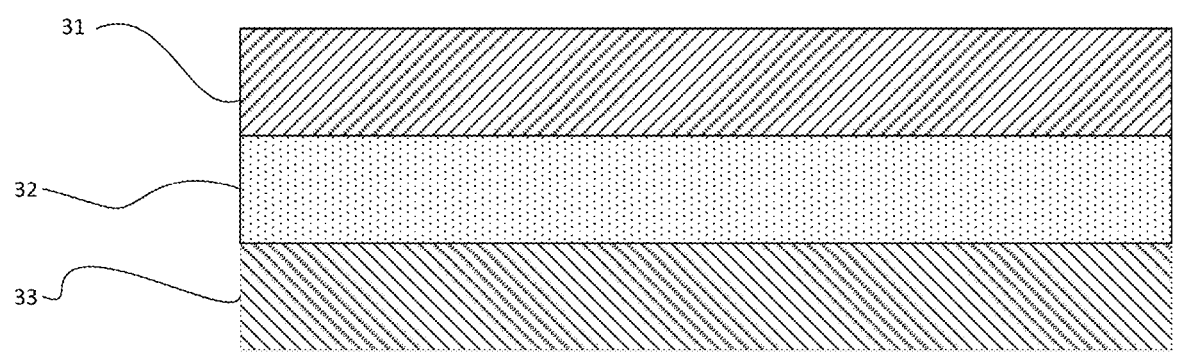
FIG. 3 is a cross section view of a multilayer film containing a soluble tie layer according to one aspect.

FIG. 2 depicts a three-layer film structure having two outer layers 21 held together by a soluble tie layer 22. The two outer layers 21 being the same composition. By contrast, FIG. 3 depicts a three-layer film structure having two outer layers 31 and 33 held together by a soluble tie layer 32. The two outer layers 31 and 33 being the distinct compositions. For example, one outer layer may be a polyester containing structure while the other being a polyethylene containing structure.

Figure 4:
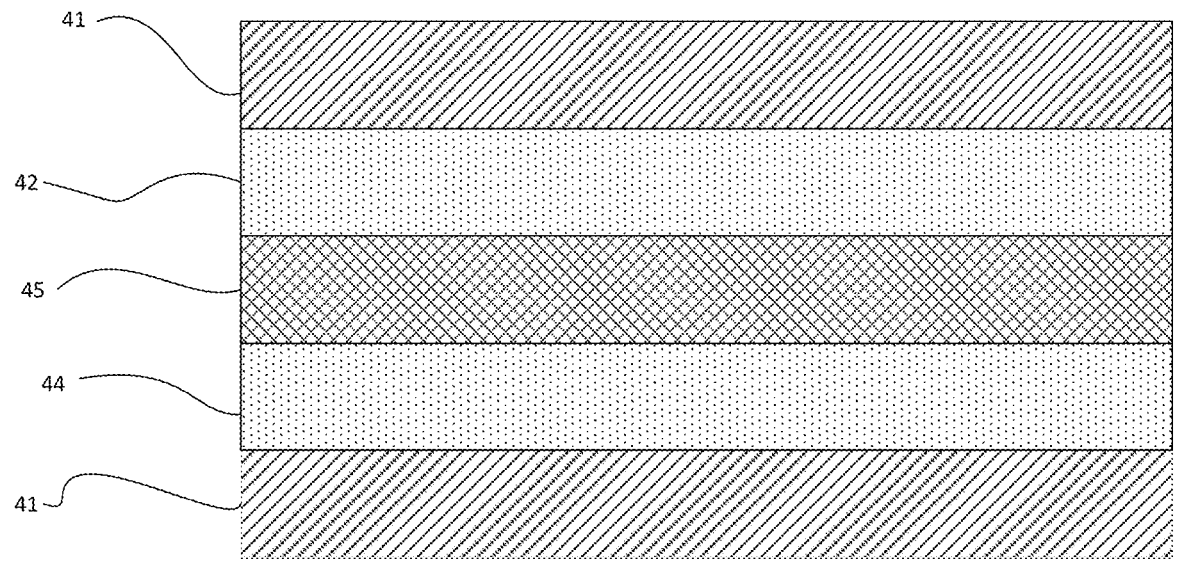
FIG. 4 is a cross section view of a multilayer film containing a soluble tie layer according to one aspect.

FIG. 4 depicts a five-layer film structure having two outer layers 41 of the same composition. Two soluble tie layers 42 and 44 are bonded to the outer layers 41 on one side and inner layer 45 on the other side. It is understood that soluble tie layers 42 and 44 may be the same or distinct compositions. Inner layer 45 may be one or more inner layers and may include a barrier layer.

Figure 5:
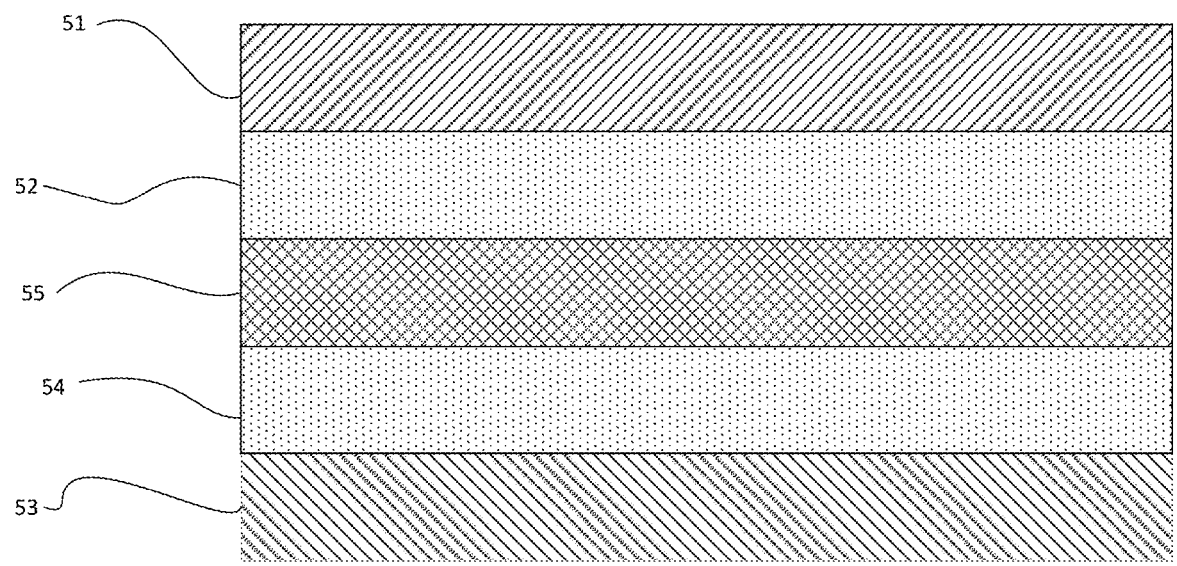
FIG. 5 is a cross section view of a multilayer film containing a soluble tie layer according to one aspect.

FIG. 5 depicts a five-layer film structure having two outer layers 51 and 53 of distinct compositions. Two soluble tie layers 52 and 54 are bonded to the outer layers 51 and 53 respectively. The two soluble tie layers 52 and 54 are each bonded to the inner layer 55. It is understood that soluble tie layers 52 and 54 may be the same or distinct compositions. Inner layer 55 may be one or more inner layers and may include a barrier layer.

Figure 6:
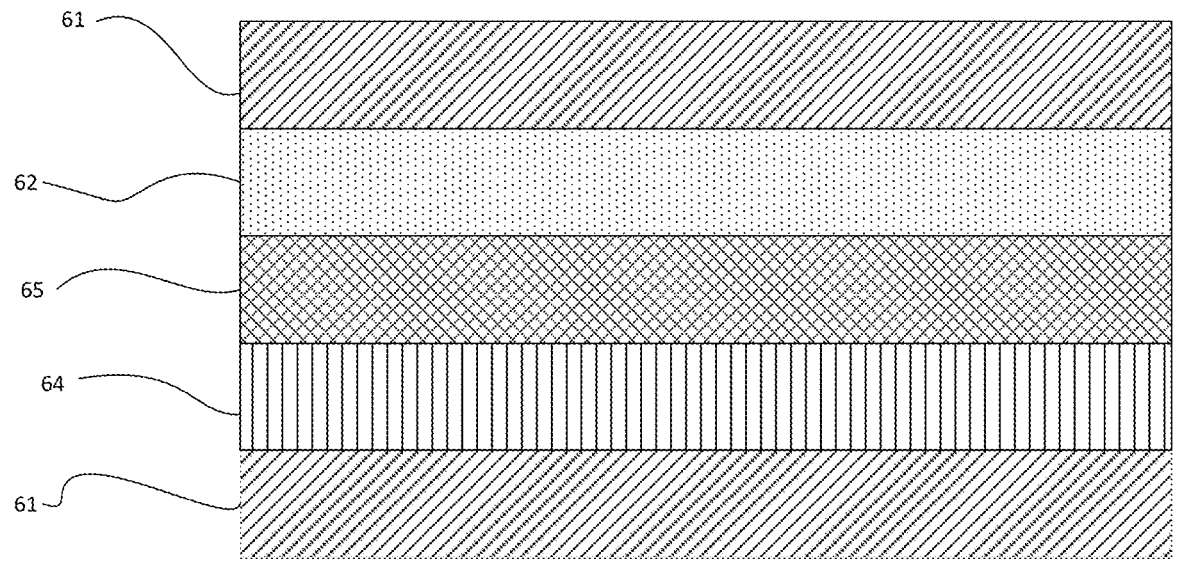
FIG. 6 is a cross section view of a multilayer film containing a soluble tie layer according to one aspect.

FIG. 6 depicts a five-layer film structure having two outer layers 61 of the same composition. A soluble tie layers 62 and an adhesive tie layer 64 are bonded to the outer layers 61 on one side and inner layer 65 on the other side. Adhesive tie layer 64 may not be soluble in a caustic solution and provides additional bond strength between adjacent layers. Inner layer 65 may be one or more inner layers and may include a barrier layer. In some embodiment inner layer 65 is soluble in a caustic solution such that dissipating soluble tie layer 62 would enable the inner layer 65 to be exposed to the caustic solution to dissolve.

Figure 7:
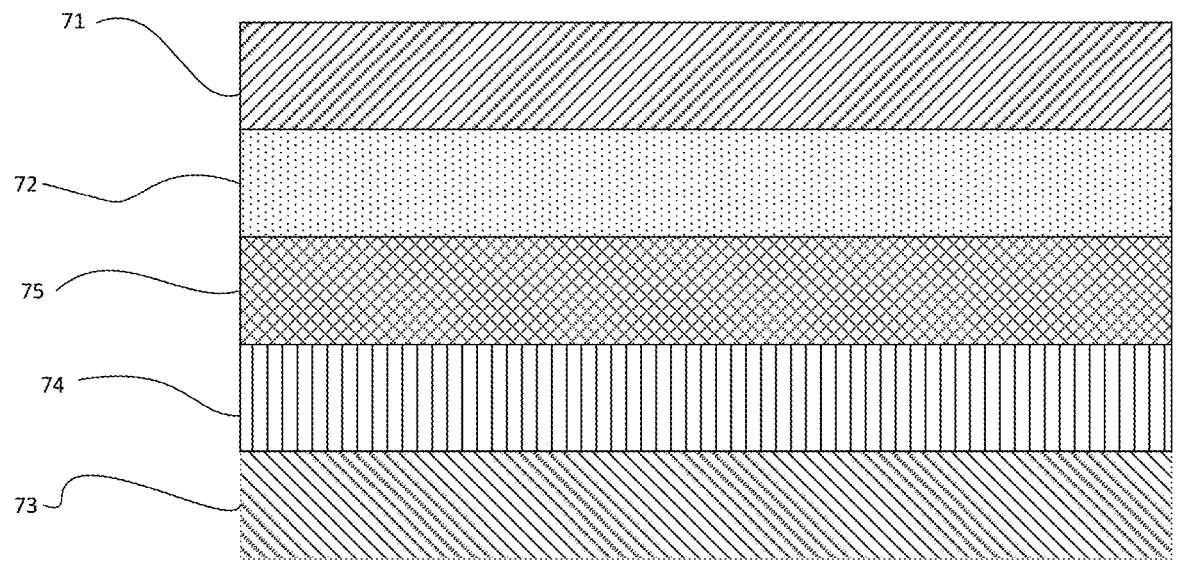
FIG. 7 is a cross section view of a multilayer film containing a soluble tie layer according to one aspect.

FIG. 7 depicts a five-layer film structure having two outer layers 71 and 73 of distinct compositions. A soluble tie layers 72 and an adhesive tie layer 74 are bonded to the outer layers 71 and 73 respectively on one side and inner layer 75 on the other side. Adhesive tie layer 74 may not be soluble in a caustic solution and provides additional bond strength between adjacent layers. Inner layer 75 may be one or more inner layers and may include a barrier layer. In some embodiment inner layer 75 is soluble in a caustic solution such that dissipating soluble tie layer 72 would enable the inner layer 75 to be exposed to the caustic solution to dissolve.

Figure 8:
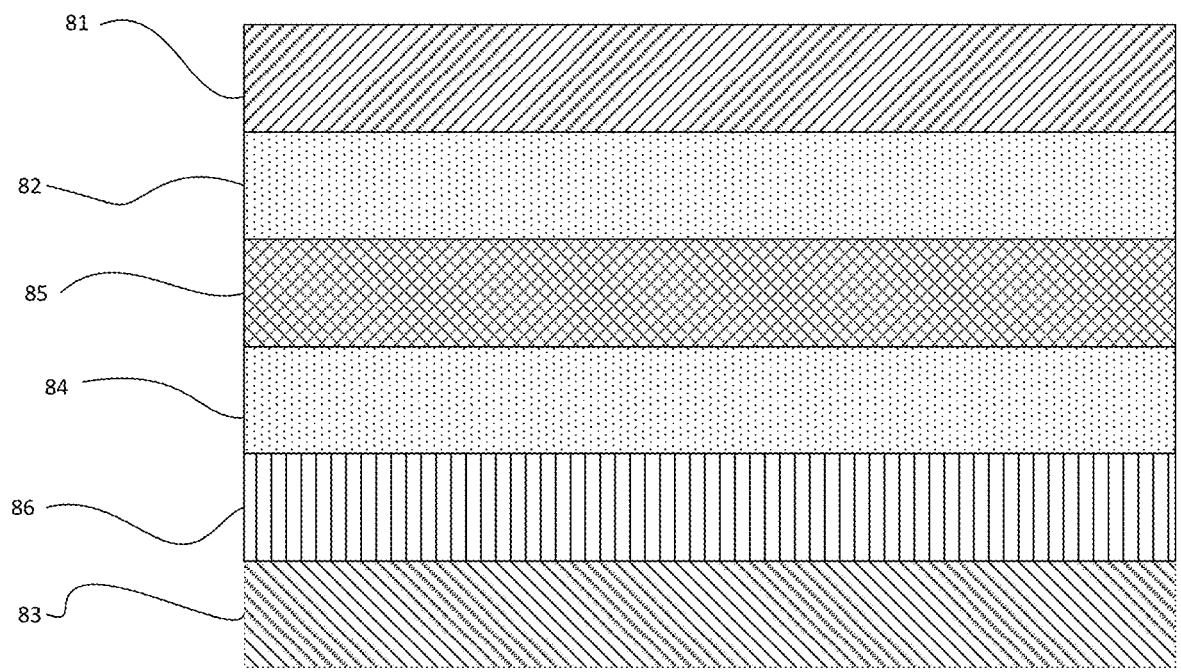
FIG. 8 is a cross section view of a multilayer film containing a soluble tie layer according to one aspect.

FIG. 8 depicts a six-layer film structure having two outer layers 81 and 83 which may be the same or distinct compositions. Soluble tie layers 82 and 84 are each bonded to inner layer 85. Adhesive tie layer 86 bonds to a soluble tie layer 84 on one side and outer layer 83 on the other side. Adhesive tie layer 84 may not be soluble in a caustic solution and provides additional bond strength between adjacent layers. Inner layer 85 may be one or more inner layers and may include a barrier layer.

Figure 9:
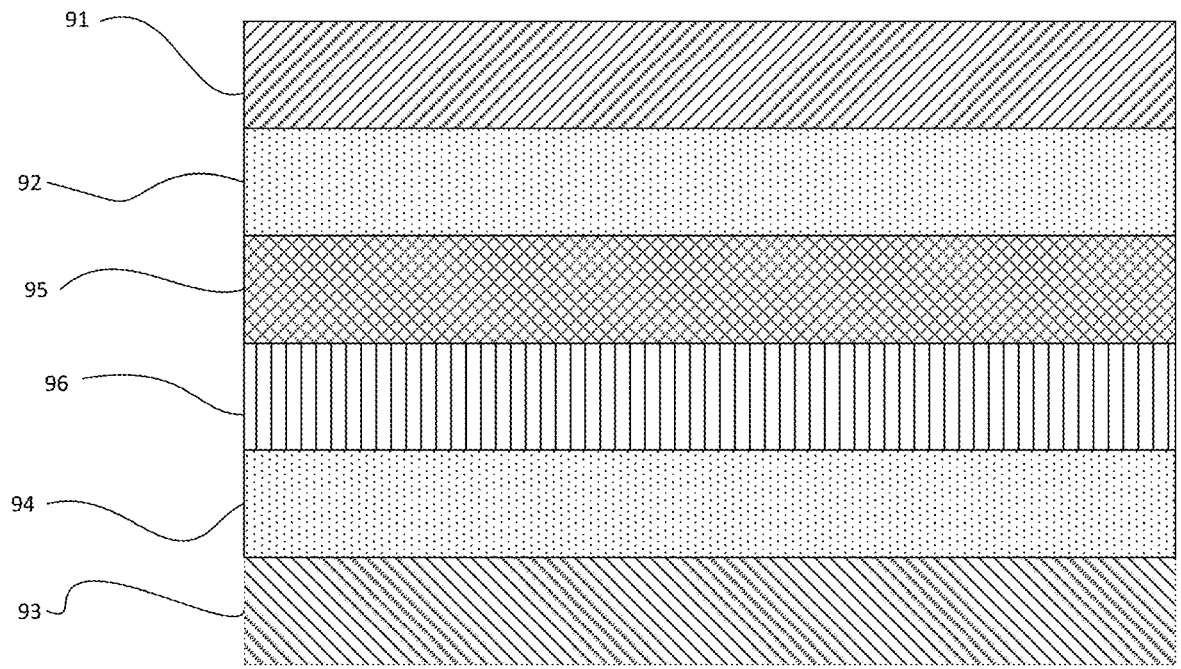
FIG. 9 is a cross section view of a multilayer film containing a soluble tie layer according to one aspect.

FIG. 9 depicts a six-layer film structure having two outer layers 91 and 93 which may be the same or distinct compositions. Soluble tie layers 92 and 94 are bonded to outer layers 91 and 93 respectively. Soluble tie layer 92 and adhesive tie layer 96 bond to an inner layer 95. Adhesive tie layer 94 may not be soluble in a caustic solution and provides additional bond strength between adjacent layers. Inner layer 95 may be one or more inner layers and may include a barrier layer.

Figure 10:
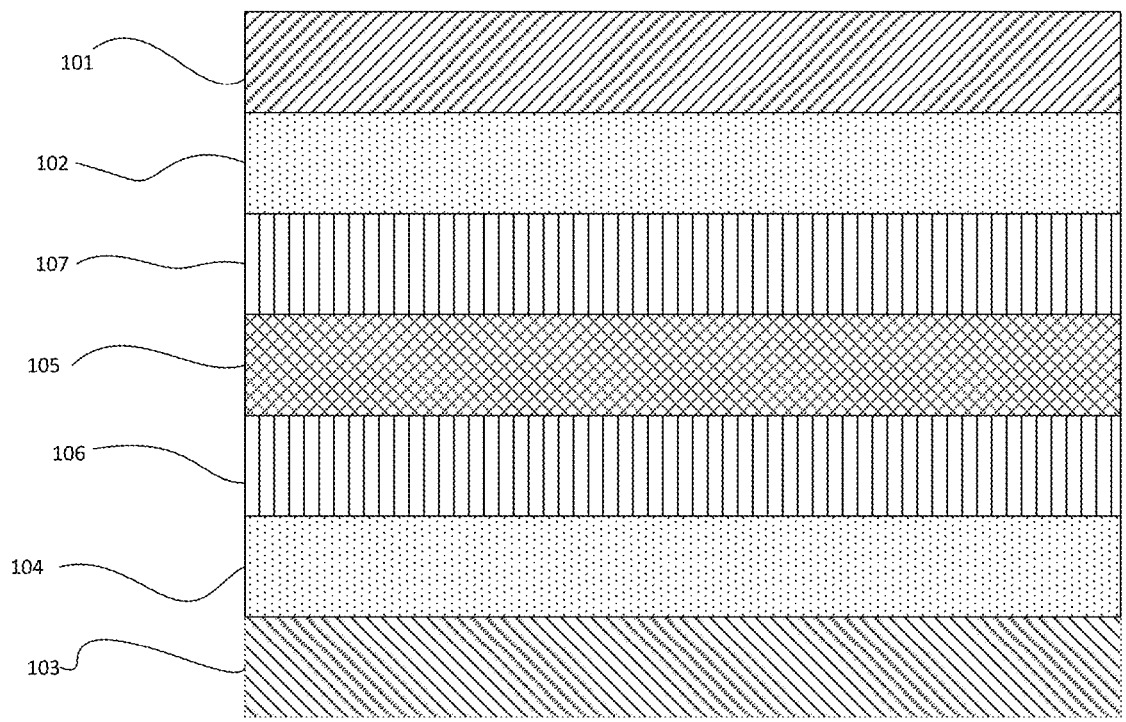
FIG. 10 is a cross section view of a multilayer film containing a soluble tie layer according to one aspect.

FIG. 10 depicts a seven-layer film structure having two outer layers 101 and 103 which may be the same or distinct compositions. Soluble tie layers 102 and 104 are bonded to outer layers 101 and 104 respectively. Two adhesive tie layers 106 and 107 each bond to inner layer 105. The adhesive tie layers 106 and 107 bond to soluble tie layers 104 and 102 respectively. Adhesive tie layer 94 may not be soluble in a caustic solution and provides additional bond strength between adjacent layers. Inner layer 95 may be one or more inner layers and may include a barrier layer.

Figure 11:
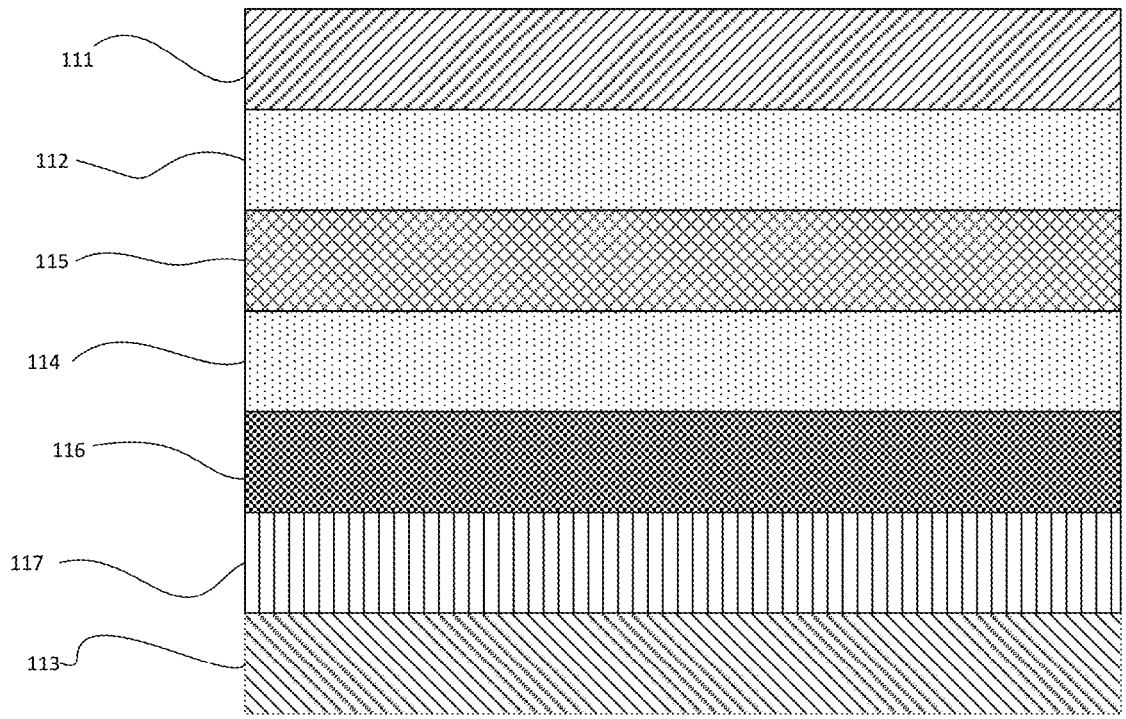
FIG. 11 is a cross section view of a multilayer film containing a soluble tie layer according to one aspect.

FIG. 11 depicts a seven-layer film structure having two outer layers 111 and 113 which may be the same or distinct compositions. Soluble tie layers 112 and 114 are bonded to inner layer 115. Adhesive tie layer 117 is bonded to outer layer 113 on one side and another inner layer 116. Inner layers 115 and 116 may be of the same or distinct compositions. Adhesive tie layer 117 may not be soluble in a caustic solution and provides additional bond strength between adjacent layers. Inner layers 115 and 116 may be one or more inner layers and may include a barrier layer.

Figure 12:
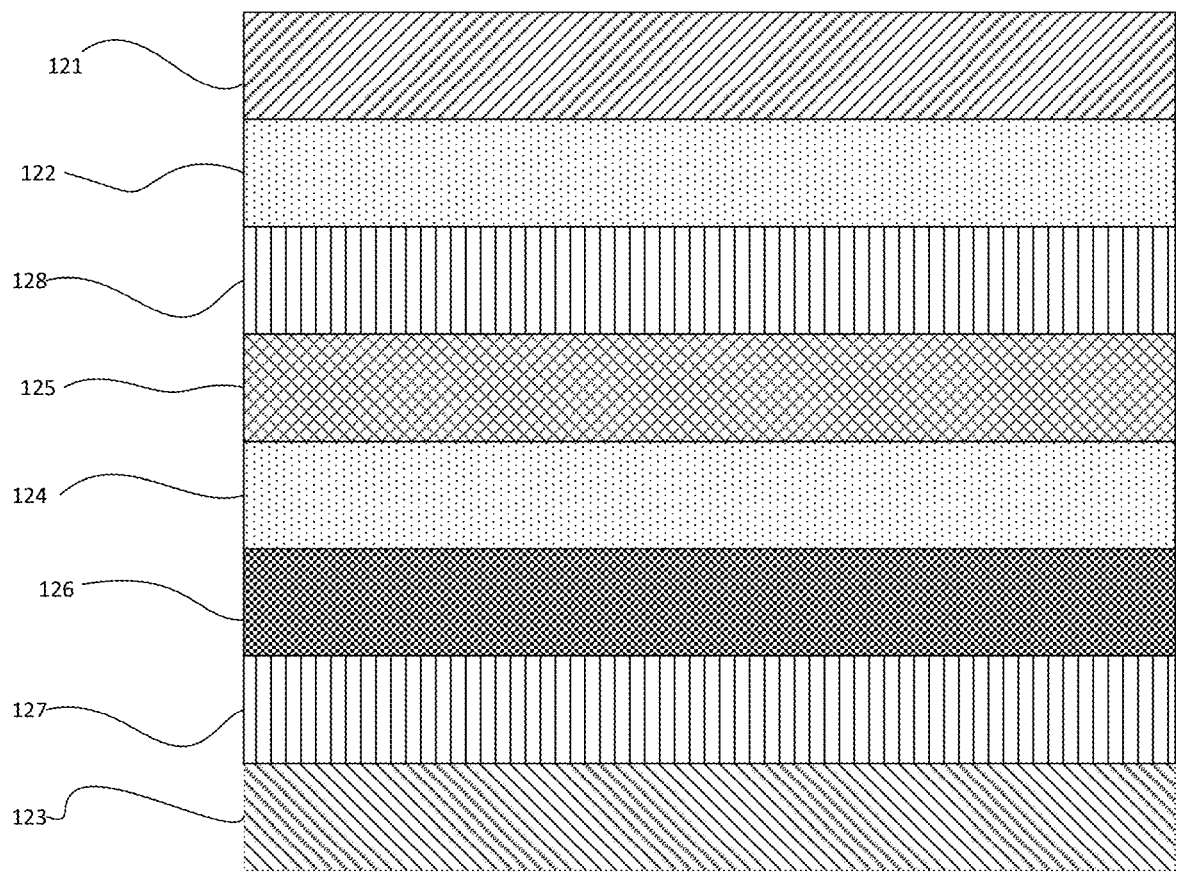
FIG. 12 is a cross section view of a multilayer film containing a soluble tie layer according to one aspect.

FIG. 12 depicts an eight-layer film structure having two outer layers 121 and 123 which may be the same or distinct compositions. Soluble tie layer 122 is bonded to outer layer 121 and adhesive tie layer 128. Adhesive tie layer 128 bonds to soluble tie layer 122 and inner layer 125. Soluble tie layer 124 is bonded to inner layer 125 on one side and inner layer 126 on the other side. Adhesive tie layer 127 is bonded to inner layer 126 on one side and outer layer 123 on the other side. Inner layers 125 and 166 may be of the same or distinct compositions. Adhesive tie layer 127 may not be soluble in a caustic solution and provides additional bond strength between adjacent layers. Inner layers 125 and 126 may be one or more inner layers and may include a barrier layer.

Figure 13:
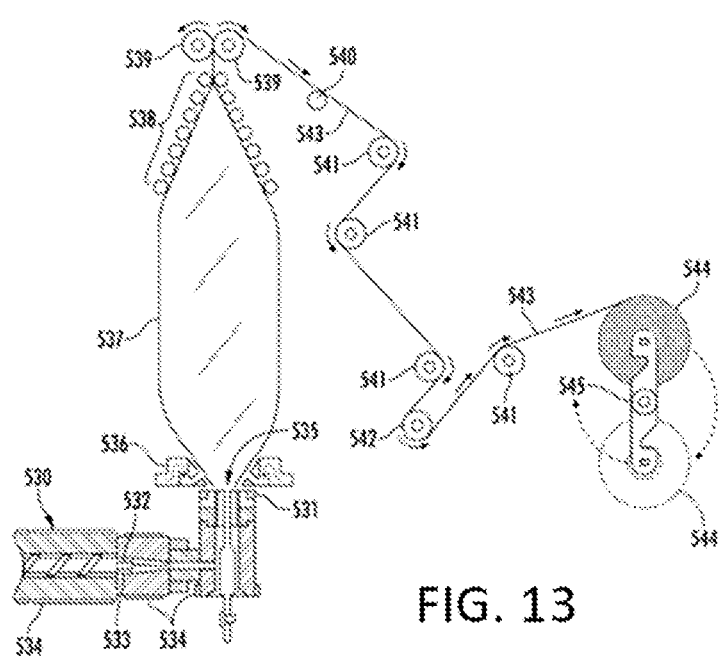
FIG. 13 is a schematic view of a hot blown film process for making multilayer films according to one aspect.

In embodiments, the film was produced by the blown film process illustrated in FIG. 13, which illustrates a schematic view of a process for making a "hot-blown" film, which is oriented in the melt state, and therefore is not heat-shrinkable. Although only one extruder 139 is illustrated in FIG. 13, it is understood that more than one extruder can be utilized to make the films.

In the process of FIG. 13, extruder 530 supplied molten polymer to annular die 531 for the formation of the film, which can be monolayer or multilayer, depending upon the design of the die and the arrangement of the extruder(s) relative to the die, as known to those of skill in the art. Extruder 530 was supplied with polymer pellets suitable for the formation of the film. Extruder 530 subjected the polymer pellets to sufficient heat and pressure to melt the polymer and forward the molten stream through annular die 531.

Extruder 530 was equipped with screen pack 532, breaker plate 533, and heaters 534. The film was extruded between mandrel 535 and die 531, with the resulting extrudate being cooled by cool air from air ring 536. The molten extrudate was immediately blown into blown bubble 537, forming a melt oriented film. The melt oriented film cooled and solidified as it was forwarded upward along the length of bubble 537. After solidification, the film tubing passed through guide rolls 538 and was collapsed into lay-flat configuration by nip rolls 539. The collapsed film tubing was optionally passed over treater bar 540, and thereafter over idler rolls 541, then around dancer roll 542 which imparted tension control to collapsed film tubing 543, after which the collapsed film tubing 543 was wound up as roll 544 via winder 545.

EXAMPLES

The following materials were utilized to make the example structures described herein.

| Material code | Description |
|---|---|
| EAA1 | Is an ethylene/acrylic acid copolymer with more than 20 wt % comonomer |
| EAA2 | Is an ethylene/acrylic acid copolymer with about 15 wt % comonomer |
| EMA1 | Is an ethylene/methyl acrylate copolymer |
| EMA2 | Is an ethylene/methyl acrylate copolymer |

| Material code | Description |
| --- | --- |
| EMAA1 | Is ananhydride-modified ethylene acrylate copolymer |
| PA1 | Is a hot-melt polyamide sold under the tradename Uni-Rez 2720 |
| PET1 | Is a copolyester based on terephthalic acid, ethylene glycol, and 1,4-cyclohexanedimethanol |
| PLA1 | Is a plasticizer |
| PS1 | Is polysorbate 60 |
| ROS1 | Is a hydrogenated rosin |
| SPE1 | Is a sulfopolyester |
| TPS1 | Is a thermoplastic starch barrier layer containing PVOH and high amylose starch |

Approximate solubility rate for Soluble Tie layers was determined by measuring the dissolution rate of pellets used to make the structure. First, the diameter of 20 pellets was measured and the maximum diameter was recorded. The pellets were then placed in a 1% NaOH solution in accordance with APR draft testing standard PET-P-00 (1 wt % NaOH, 85° C.) and agitating rigorously. The time for all pellets to dissolve was then recorded. Pellet diameter was divided by dissolution time to obtain a solubility rate in terms of in/min.

As shown in FIGS. 1A-1D, the dissolution of the soluble tie layer is assumed to be mostly one dimensional, with dissolution occurring only at the exposed edges of the structure. The solubility rate was also assumed to be constant over time and independent of the changing diameter. Therefore, the width of the ground flake, specified by APR draft testing standard PET-P-00 is a maximum of 0.375 inches and is used to determine the time it takes for the soluble tie layer to fully dissolve out of the structure. It should be noted however, that real world recycling is largely non-uniform, resulting in different individual flake sizes, shear rates, etc, which can affect the overall dissolution time within the system. For example, dissolution could occur much more rapidly if layers of a flake are sheared apart resulting in full exposure of the soluble tie layer allow. Therefore, in embodiments disclosed herein, the soluble tie layer has a minimum dissolution rate of at least 0.004 in/min.

The solubility rates for various soluble tie formulations are shown in Table 2 below.

TABLE 2

Linear Dissolution rates of various Soluble Tie Resin Blends

| Sample ID | Formulation | Linear Dissolution Rate | Notes |
| --- | --- | --- | --- |
| Soluble Tie 1 (W) | 80% (60% Neutralized EAA1)/20% ROS1 | 0.006 in/min | |
| Soluble Tie 2 (W) | 90% (60% Neutralized EAA1)/10% ROS1 | 0.0055 in/min | |
| Soluble Tie 3 | 100% (60% Neutralized EAA1) | 0.004 in/min | |
| Soluble Tie 4 (W) | 80% (60% Neutralized EAA1)/20% SPE1 | 0.0065 in/min | |
| Soluble Tie 5 (W) | 90% (60% Neutralized EAA1)/10% SPE1 | 0.005 in/min | |
| Soluble Tie 6 (C) | 60% (60% Neutralized EMA1)/40% ROS1 | <0.0025 in/min | Did not fully dissolve |
| Soluble Tie 7 (C) | 80% (60% Neutralized EAA1)/20% EMAA1 | <0.0025 in/min | Did not fully dissolve |
| Soluble Tie 8 (C) | 90% EMAA1/10% PLA1 | <0.0025 in/min | Did not fully dissolve |
| Soluble Tie 9 (W) | 50% (60% Neutralized EAA1)/10% EAA2/20% ROS1/30% EMAA1 | 0.015 in/min | |
| Soluble Tie 10 (C) | 69% EMA1/25% ROS1/6% KOH | <0.0025 in/min | |
| Soluble Tie 11 (W) | 64% EMA1/25% ROS1/5% PS1/6% KOH | — | Quickly broke apart and dispersed |
| Soluble Tie 12 (W) | 20% EMAA1/20% ROS1/40% (60% Neutralized EAA1)/20% EAA2 | >0.02 in/min | |
| Soluble Tie 13 (W) | 28% EMAA1/20% ROS1/40% EAA1/10% EAA2/12% KOH | — | Dissolved very rapidly |
| Soluble Tie 14 (W) | 30% ROS1/5% PS1/35% PA1/30% Neutralized EAA1 | — | Dissolved very rapidly |
| Soluble Tie 15 (C) | 50% EMAA1/50% EMA2 | <0.0025 | Did not dissolve |
| Soluble Tie 15 (C) | 50% EMAA1/50% Neutralized EAA1 | <0.0025 | Did not dissolve within reasonable time frame |
| Soluble Tie 16 (C) | 50% EMAA1/50% ROS1 | <0.0025 | Did not dissolve within reasonable time frame, low viscosity |

TABLE 3

Example Structure 1 ("Dual Sided")

| | |
| --- | --- |
| Outer PET Layer | PET1 |
| Adhesive Tie 1 | EMAA1 |
| Soluble Tie 1 | 80% (60% Neutralized EAA1)/20% ROS1 |
| Barrier layer | TPS1 |
| Soluble Tie 2 | 80% (60% Neutralized EAA1)/20% ROS1 |
| Adhesive Tie 2 | EMAA1 |
| Outer PET Layer | PET1 |

Example structure 1 is a seven-layer structure. One side of the overall structure was formed utilizing an extrusion coating process and coated onto the pre-made barrier web. The structure then traveled to a secondary coating station where the other side is coated, resulting in the full structure as shown in Table 3 above.

TABLE 4

Example Structure 2 ("Single Sided")

| | |
| --- | --- |
| Outer PET Layer | PET1 |
| Adhesive Tie | EMAA1 |
| Soluble Tie 1 | 80% (60% Neutralized EAA1)/20% ROS1 |
| Barrier | TPS1 |
| Adhesive Tie | EMAA1 |
| Outer PET Layer | PET1 |

The soluble tie layer must also demonstrate good adhesion/bond strength to both adjacent layers. Typically, multilayer films require a minimum of 1 lbf/in, and in some applications up to 4-7 lbf/in. Adhesion of various structures are shown in table 5 below. In these cases, the failure point occurred between the soluble tie layer and the barrier layer, therefore it can be assumed that the bond strengths between the other layers are stronger than the recorded failure strength.

Films for bond strength testing were produced on a flat cast extrusion line and then laminated to the barrier layer using a 1-in wide heat sealer (130° C., 80 psi, 5 second heat time). The samples were then submitted for bond strength testing on an Instron machine in accordance with ASTM F904. All samples were tested in triplicate.

TABLE 5

Bond Strength

| Structure | Bond Strength |
|---|---|
| PET1/[70% EMAA1/30% EMA2]/[80% Neutralized EAA1 + 20% ROS1]/TPS1 | 5.3 lbf/in |
| PET1/[70% EMAA1/30% EMA2]/[90% Neutralized EAA1 + 10% ROS1]/TPS1 | 5.0 lbf/in |
| PET1/EMAA1/[90% Neutralized EAA1 + 10% AQ48 Ultra]/TPS1 | 8.9 lbf/in |
| PET1/EMAA1/[90% Neutralized EAA1]/TPS1 | ~0 lbf/in |
| PET1/EMAA1/[50% EMAA1/50% Neutralized EAA1]/TPS1 | ~0 lbf/in |
| PET1/[25% ROS1/5% PS1/40% PA1/30% polyethyloxazoline]/TPS1 | adhered to TPS1 but not PET1 |
| PET1/[30% ROS1/5% PS1/35% PA1/30% Neutralized EAA1]/TPS1 | Adhered to both layers |
| PET1/[15% Castor Wax/20% ROS1/20% Neutralized EAA1/20% EAA2/5% PS1/20% polyethyloxazoline]/TPS1 | Sticks to TPS1, slight tack to PET1 |
| PET1/[50% EMAA1/50% Neutralized EAA1]/TPS1 | N/A |
| PET1/Neutralized EAA1/TPS1 | N/A |
| PET1/[69% EMA1/25% ROS1/6% KOH]/TPS1 | N/A |
| PET1/[64% EMA1/25% ROS1/5% PS1/6% KOH]/TPS1 | Sticks to TPS1, slight tack to PET1 |

Soluble tie layers that had both adequate bond strength and solubility rates were laminated to the barrier layer to produce a structure similar to that shown in Example Structure 1. These seven-layer structures were then tested in accordance with the APR recycling protocol as outlined in PET-CG-01. Additionally, several structures in were produced in accordance with Table 4. These structures only incorporate the soluble tie layer on one side of the barrier material. Structures produced in accordance with Table 1 are labeled as "Dual Sided" and structure produced in accordance with Table 2 are labeled as "Single Sided".

Starch was selected as the barrier layer for ease of identifying impurities during the testing protocol. It is understood that any suitable barrier layer could be employed with the soluble tie layer. The baking step of the PET-CG-01 protocol caused any residual starch contaminates to burn and turn brown color. The brown color allowed for quick evaluation of impurity levels. Following this baking step, the brown contaminants were separated from the clear flake and the weights of clean flake and contaminant flake were recorded. The overall contamination rate of barrier starch remaining in flake was then calculated based on the known weight percentages of the overall structure. The results of the wash protocol and resulting contamination levels are shown below in Table 5.

| Structure | Contamination Rate |
|---|---|
| PET1/EMAA1/(80% Neutralized EAA1/20% SPE1)/TPS1/EMAA1/PET1 | <1% |
| PET1/EMAA1/(90% Neutralized EAA1/10% SPE1)/TPS1/EMAA1/PET1 | <1% |
| PET1/EMAA1/(90% Neutralized EAA1/10% SPE1)/(TPS1/90% Neutralized EAA1/10% SPE1)/EMAA1/PET1 | <0.5% |
| PET1/EMAA1/(80% Neutralized EAA1/20% ROS1)/TPS1/EMAA1/(80% Neutralized EAA1/20% ROS1)/EMAA1/PET1 | <1% |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multilayer film comprising:
   i. a first outer layer;
   ii. a first soluble tie layer adhered to two adjacent layers, the first soluble tie layer comprising at least 10 wt % of an ethylene acrylic acid copolymer, ethylene methacrylic acid copolymer, or blend thereof which is between 20-90% neutralized; and
   iii. a second outer layer;
   the first soluble tie layer being disposed between the first and second outer layers,
   the first soluble tie layer being adhered to the two adjacent layers with a bond strength of at least 2.5 N/15 mm measured in accordance with ASTM F904 wherein the first and the second outer layers remain solid and at least 90 wt % the first soluble tie layer dissipates from the multilayer film in a caustic solution comprising 1 wt % sodium hydroxide within 30 minutes at a temperature of 45° C. when the multilayer film is prepared and tested with the remaining parameters being in accordance with APR draft testing standard PET-P-00, wherein the multilayer film further comprises a first inner layer disposed between the first soluble tie layer and either of the first or second outer layers; wherein the first inner layer comprises a barrier material chosen from ethylene vinyl alcohol, polyvinyl alcohol, thermoplastic starch, polyvinylidene chloride, or polyamides, the multilayer film further comprises:
   a. a second soluble tie layer directly adhered to the first inner layer;
   b. a polyethylene terephthalate layer directly adhered to the second soluble tie layer;
   c. an adhesive tie layer comprising polyethylene directly adhered to the polyethylene terephthalate layer; and
   d. a polyethylene outer layer directly adhered to the adhesive tie layer, the polyethylene outer layer being the first outer layer.

2. The multilayer film of claim 1 wherein the first soluble tie layer further comprises up to 30 wt % ethylene methyl acrylate, modified linear low density polyethylene, or blends thereof.

3. The multilayer film of claim 1 wherein the ethylene acrylic acid copolymer is between 20-90% neutralized through the addition of KOH or NaOH.

4. The multilayer film of claim 1 wherein the first soluble tie layer further comprises up to 30 wt % of a sulfopolyester.

5. The multilayer film of claim 1 wherein the first soluble tie layer further comprises up to 40 wt % of a caustic soluble rosin modifier.

6. The multilayer film of claim 1 wherein at least 95 wt % of the first soluble tie layer dissipates from the multilayer film in a caustic solution comprising 1 wt % sodium hydroxide within 30 minutes at a temperature of 45° C. when the multilayer film is prepared and tested with the remaining parameters being in accordance with APR draft testing standard PET-P-00.

7. The multilayer film of claim 1 wherein the first soluble tie layer further comprises up to 10 wt % of a plasticizer.

8. The multilayer film of claim 7 wherein the plasticizer is glycerol.

9. The multilayer film of claim 1 wherein the second soluble tie layer comprises at least 10 wt % of an ethylene acrylic acid copolymer having been between 20-90% neutralized through the addition of KOH or NaOH.

10. The multilayer film of claim 1 wherein the first soluble tie layer has a linear dissolution rate of at least 0.004 in/min when placed in a caustic solution comprising 1 wt % sodium hydroxide within 30 minutes at a temperature of 85° C. when the multilayer film is prepared and tested with the remaining parameters being in accordance with APR draft testing standard PET-P-00.

11. A multilayer film comprising:
i. a first outer layer;
ii. a first soluble tie layer adhered to two adjacent layers, the first soluble tie layer comprising at least 10 wt % of an ethylene acrylic acid copolymer, ethylene methacrylic acid copolymer, or blend thereof which is between 20-90% neutralized; and
iii. a second outer layer;
the first soluble tie layer being disposed between the first and second outer layers,
the first soluble tie layer being adhered to the two adjacent layers with a bond strength of at least 2.5 N/15 mm measured in accordance with ASTM F904 wherein the first and the second outer layers remain solid and at least 90 wt % the first soluble tie layer dissipates from the multilayer film in a caustic solution comprising 1 wt % sodium hydroxide within 30 minutes at a temperature of 45° C. when the multilayer film is prepared and tested with the remaining parameters being in accordance with APR draft testing standard PET-P-00, wherein the multilayer film further comprises a first inner layer disposed between the first soluble tie layer and either of the first or second outer layers; wherein the second outer layer comprises polyethylene terephthalate, the first inner layer is a barrier layer and the first soluble tie layer is directly adhered to the first inner layer and a first adhesive tie layer, the first adhesive tie layer being directly adhered to the second outer layer, the multilayer film further comprising:
a. a second soluble tie layer directly adhered to the first inner layer;
b. a second adhesive tie layer directly adhered to the second soluble tie layer
c. a polyethylene terephthalate layer directly adhered to the second adhesive tie layer;
d. a third adhesive tie layer comprising polyethylene directly adhered to the polyethylene terephthalate layer; and
e. a polyethylene outer layer directly adhered to the third adhesive tie layer, the polyethylene outer layer being the first outer layer.

12. The multilayer film of claim 11 wherein the first inner layer comprises a barrier material chosen from ethylene vinyl alcohol, polyvinyl alcohol, thermoplastic starch, polyvinylidene chloride, or polyamides.

13. A multilayer film comprising:
i. a first outer layer;
ii. a first soluble tie layer adhered to two adjacent layers, the first soluble tie layer comprising at least 10 wt % of an ethylene acrylic acid copolymer, ethylene methacrylic acid copolymer, or blend thereof which is between 20-90% neutralized; and
iii. a second outer layer;
the first soluble tie layer being disposed between the first and second outer layers,
the first soluble tie layer being adhered to the two adjacent layers with a bond strength of at least 2.5 N/15 mm measured in accordance with ASTM F904 wherein the first and the second outer layers remain solid and at least 90 wt % the first soluble tie layer dissipates from the multilayer film in a caustic solution comprising 1 wt % sodium hydroxide within 30 minutes at a temperature of 45° C. when the multilayer film is prepared and tested with the remaining parameters being in accordance with APR draft testing standard PET-P-00, wherein the multilayer film further comprises a first inner layer disposed between the first soluble tie layer and either of the first or second outer layers; wherein the second outer layer comprises polyethylene terephthalate, the first inner layer is a barrier layer and the first soluble tie layer is directly adhered to the first inner layer and a first adhesive tie layer, the first adhesive tie layer being directly adhered to the second outer layer, the multilayer film further comprising:
a. a second adhesive tie layer directly adhered to the first inner layer;
b. a polyethylene terephthalate layer directly adhered to the second adhesive tie layer;
c. a third adhesive tie layer comprising polyethylene directly adhered to the polyethylene terephthalate layer; and
d. a polyethylene outer layer directly adhered to the third adhesive tie layer, the polyethylene outer layer being the first outer layer.

14. The multilayer film of claim 13 wherein at least 95 wt % of the first inner layer dissolves in a caustic solution comprising 1 wt % sodium hydroxide within 15 minutes at a temperature of 85° C. in accordance with APR draft testing standard PET-P-00.

* * * * *